(12) United States Patent
Tashiro et al.

(10) Patent No.: US 11,975,709 B2
(45) Date of Patent: May 7, 2024

(54) VEHICLE CONTROL DEVICE

(71) Applicant: HITACHI ASTEMO, LTD., Ibaraki (JP)

(72) Inventors: Naoyuki Tashiro, Tokyo (JP); Masashi Seimiya, Ibaraki (JP); Satoshi Matsuda, Ibaraki (JP); Masato Imai, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 300 days.

(21) Appl. No.: 17/430,209

(22) PCT Filed: Feb. 5, 2020

(86) PCT No.: PCT/JP2020/004242
§ 371 (c)(1),
(2) Date: Aug. 11, 2021

(87) PCT Pub. No.: WO2020/189061
PCT Pub. Date: Sep. 24, 2020

(65) Prior Publication Data
US 2022/0161785 A1 May 26, 2022

(30) Foreign Application Priority Data
Mar. 15, 2019 (JP) ................................ 2019-048026

(51) Int. Cl.
*B60W 30/06* (2006.01)
*B60W 10/20* (2006.01)
(Continued)

(52) U.S. Cl.
CPC ............ *B60W 30/06* (2013.01); *B60W 10/20* (2013.01); *G01C 21/3685* (2013.01); *B60W 2520/10* (2013.01); *B60W 2710/20* (2013.01)

(58) Field of Classification Search
CPC .......... B60W 30/06; B60W 2554/801; B60W 2754/20; B60W 2554/802;
(Continued)

(56) References Cited

U.S. PATENT DOCUMENTS

2017/0028914 A1* 2/2017 Kiyokawa .......... G01C 21/3415
2017/0032680 A1* 2/2017 Imai .................... G01C 21/3407
(Continued)

FOREIGN PATENT DOCUMENTS

JP 2004-352110 A 12/2004
JP 2015-214224 A 12/2015
(Continued)

OTHER PUBLICATIONS

International Search Report, PCT/JP2020/004242, dated Jun. 2, 2020, 2 pgs.

*Primary Examiner* — Khoi H Tran
*Assistant Examiner* — Tanner L Cullen
(74) *Attorney, Agent, or Firm* — Volpe Koenig

(57) ABSTRACT

A vehicle parking control device has a processor and a memory to control the vehicle from a starting to a target parking position. The vehicle control device includes an obstacle detection unit detecting obstacles around the vehicle, a travelable area setting unit setting an area where the vehicle can travel based on a position of the obstacles, and sets the target parking position in the travelable area, a route generation unit calculating a travel route to the target parking position in the travelable area, and a parking execution unit that causes the vehicle to travel toward the target parking position on the basis of the travel route. The route generation unit generates a route from a parking start position to the target parking position, and corrects a dis-
(Continued)

tance of the section to a predetermined distance when the distance of the section is less than the predetermined distance.

11 Claims, 19 Drawing Sheets

(51) Int. Cl.
*G01C 21/36* (2006.01)
*B60W 10/04* (2006.01)
*B60W 10/18* (2012.01)

(58) Field of Classification Search
CPC ........... B60W 2754/30; B60W 30/095; B60W 10/20; B60W 2710/20; B62D 15/0285; B62D 15/028; B62D 15/027; G01C 21/3685; G05D 1/0212
See application file for complete search history.

(56) References Cited

U.S. PATENT DOCUMENTS

| | | |
|---|---|---|
| 2017/0259850 A1* | 9/2017 | Yamashita ............... B62D 6/00 |
| 2018/0093663 A1 | 4/2018 | Kim et al. |
| 2019/0241177 A1 | 8/2019 | Suzuki et al. |
| 2020/0055514 A1 | 2/2020 | Tsuge et al. |

FOREIGN PATENT DOCUMENTS

| | | | |
|---|---|---|---|
| WO | WO-2012084502 A1 * | 6/2012 | ............ B60W 30/06 |
| WO | WO-2016020356 A1 * | 2/2016 | ............ B60W 50/08 |
| WO | 2018/051396 A1 | 3/2018 | |
| WO | 2019/003720 A1 | 1/2019 | |

* cited by examiner

VEHICLE CONTROL DEVICE

TECHNICAL FIELD

The present invention relates to a vehicle control device that supports parking of a vehicle.

BACKGROUND ART

An advanced driving support system for preventing a traffic accident and reducing a driver's driving load during a traffic jam has been developed. There is an automatic parking system as one of advanced driving support systems. The automatic parking system is a system in which, when a driver designates a target parking position, a control device of a vehicle automatically performs part or all of accelerator, brake, and steering operations to park the vehicle.

In a vehicle that provides automatic parking, first, a sensing device such as a camera or an ultrasonic sensor that grasps the surrounding environment of the host vehicle is attached, and a control device calculates a travelable area on the basis of position information (sensor information) of an obstacle (such as a parked vehicle) acquired from the sensing device.

Next, the control device calculates a steering wheel turn-back position and the like based on the calculated travelable area, calculates a planned moving route to a target parking position, and controls the vehicle according to the route in a case where searching of the route is successful. Since the start and stop of the automatic control are determined by the driver, it is necessary to present planned operation (a position of a movement destination, a movement route, and the like) of the automatic parking system to the driver in an easy-to-understand manner.

For this problem, PTL 1 discloses a technique of displaying a track of a planned movement on a navigation system or the like at predetermined intervals so that a steering amount can be easily grasped at the time of parking in which a host vehicle is controlled to move backward while turning.

CITATION LIST

Patent Literature

PTL 1: JP 2015-214224 A

SUMMARY OF INVENTION

Technical Problem

In the automatic parking system, a route with a shorter parking route length is searched for so that the time until completion of parking is shortened. As illustrated in FIG. 1A, when a route from a position of a vehicle 300 at the start of automatic parking to a target parking position (parking frame 120) is searched for, in a case where the vehicle 300 at the start of automatic parking is located in front of the parking frame 120, a planned moving route 107 is long.

In contrast, in a case where the automatic parking start position is further than the parking frame 120 (FIG. 1B), the planned moving route 107 may be shortened. In PTL 1, the display, which is presented at predetermined distance intervals, may be difficult for the driver to perceive depending on a movement amount of each section.

In the case of FIG. 1A, the vehicle 300 is steered slightly rightward to move forward after passing the parking position (parking frame 120), temporarily stopped at a steering wheel turn-back position 108, and then steered leftward to move backward. The vehicle 300 increases the vehicle speed to some extent to the steering wheel turn-back position 108, then decelerates and stops.

In contrast, in the case of FIG. 1B, the vehicle 300 is steered slightly rightward and moves slightly forward to reach a steering wheel turn-back position 109. After that, the vehicle 300 is steered to the left and moves backward.

In this case, the vehicle 300 stops at a position where a tire has rotated several times, and, even if the track of the planned movement is displayed on the navigation system, there has been a case where a brake operation is performed in a manner unintentional for the driver and causes a sense of discomfort.

Further, in the case of FIG. 1B, since the distance from the automatic parking start position to the steering wheel turn-back position 109 is extremely short, the vehicle speed hardly increases. Therefore, there has been a problem that a pulse interval of a wheel speed sensor becomes long and it is difficult to ensure the control accuracy.

Solution to Problem

The present invention is a vehicle control device that has a processor and a memory, is mounted on a vehicle, and controls the vehicle to a target parking position. The vehicle control device includes an obstacle detection unit that detects a position of an obstacle around the vehicle, a travelable area setting unit that sets an area where the vehicle can travel as a travelable area based on a position of the obstacle, and sets the target parking position in the travelable area, a route generation unit that calculates a travel route to the target parking position in the travelable area, and a parking execution unit that causes the vehicle to travel toward the target parking position on the basis of the travel route. The route generation unit generates a route from a set parking start position to the target parking position in one or more sections, and corrects a distance of the section to a predetermined distance or more in a case where the distance of the section is less than the predetermined distance.

Advantageous Effects of Invention

According to the present invention, a driver is allowed to perceive content of control planned to be performed by the vehicle control device for various parking start positions, so that smooth automatic parking can be realized.

Details of at least one implementation of the subject matter disclosed in the present description are set forth in the accompanying drawings and description below. Other features, aspects, and effects of the disclosed subject matter will be clarified from disclosure, drawings, and claims below.

DESCRIPTION OF EMBODIMENTS

Hereinafter, embodiments of the present invention will be described with reference to the accompanying drawings.

First Embodiment

Figure 2:
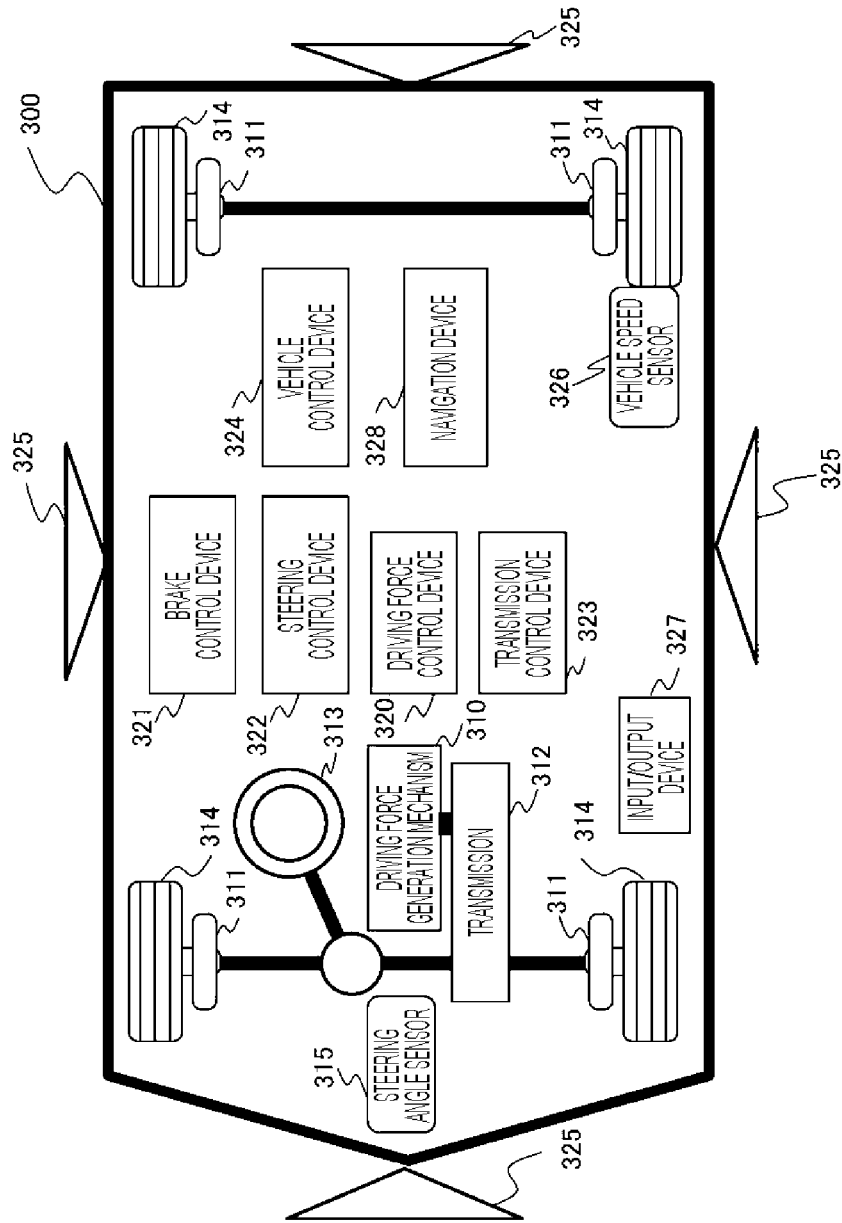
FIG. 2 is a block diagram illustrating a first embodiment of the present invention and illustrating a configuration of a vehicle including a vehicle control device.

FIG. 2 is a block diagram illustrating a configuration of a vehicle including a vehicle control device 324 in a first embodiment of the present invention.

A vehicle 300 includes a driving force generation mechanism 310 that is a power source, a brake 311 that brakes the vehicle, and a transmission 312 having a transmission mechanism that switches a driving force generated by the driving force generation mechanism 310 to an appropriate direction and moves the vehicle forward or backward. The output of the transmission 312 rotates left and right wheels 314 to cause the vehicle 300 to travel, and the brake 311 is controlled to generate a braking force and decelerate the vehicle 300.

The driving force generation mechanism 310 may be an engine, a hybrid mechanism of an engine and a motor, or a single motor. The vehicle 300 includes a steering 313, and the steering 313 is operated to change a steering angle of the wheels 314, so that the vehicle 300 turns.

The brake 311 includes an actuator that controls a braking force. The transmission 312 includes an actuator that performs gear shifting. The steering 313 includes an actuator that performs steering. A control device is connected to each actuator.

A driving force control device 320 controls a driving force generated by the driving force generation mechanism 310. A transmission control device 323 switches forward or backward movement of the vehicle and controls a transmission ratio. A brake control device 321 controls the brake 311 to generate a predetermined braking force (braking torque).

Even in a case where the driver does not operate the steering 313, the steering control device 322 controls the steering 313 to have a predetermined steering angle.

The vehicle 300 is provided with a plurality of surrounding situation recognition sensors 325 that recognize a surrounding situation of the vehicle, a vehicle speed sensor 326 that acquires speed information of the vehicle, and a steering angle sensor 315 that detects a steering angle of the steering 313. Further, the vehicle 300 is equipped with a navigation device 328 that detects a host vehicle position using a global positioning system (GPS). Note that estimation of the host vehicle position may be performed by calculation from a detection value of the wheel speed sensor (vehicle speed sensor 326) and the steering angle sensor 315.

In the illustrated example, an example in which the surrounding situation recognition sensors 325 are installed on the front, rear, and side of the vehicle 300 is illustrated.

As the surrounding situation recognition sensor (obstacle detection unit) 325, a camera, a sonar, or the like is used to detect an obstacle or a white line around the vehicle 300. Further, the surrounding situation recognition sensor 325 may include an optical distance measuring device or a distance measuring device using an electromagnetic wave. Further, the surrounding situation recognition sensor 325 functions as an obstacle position detection unit.

Further, the vehicle speed sensor 326 that acquires speed information of the vehicle 300 is not limited to pulse information of the wheel speed sensor, and each control device may indirectly perform calculation using a value detected by a resolver rotation speed sensor of a motor, a rotation speed sensor of the transmission 312, or the like.

The vehicle control device 324 receives information from the surrounding situation recognition sensor 325, the vehicle speed sensor 326, and the steering angle sensor 315, and transmits a command value to the driving force control device 320, the brake control device 321, the steering control device 322, and the transmission control device 323.

Furthermore, an input/output device 327 that receives an input or a command from the driver regarding information related to automatic parking and presents the information to the driver is provided. Specific input information includes determination of a parking position, start of automatic parking, and the like, and output information includes a parking frame as a target parking position, travel route information, a steering wheel turn-back position, a bird's-eye view in which images around the host vehicle during automatic parking are combined, and the like. Note that the input/output device 327 may be included in the navigation device 328. Further, the input/output device 327 can include a touch panel, a microphone, and a speaker.

Figure 3A:
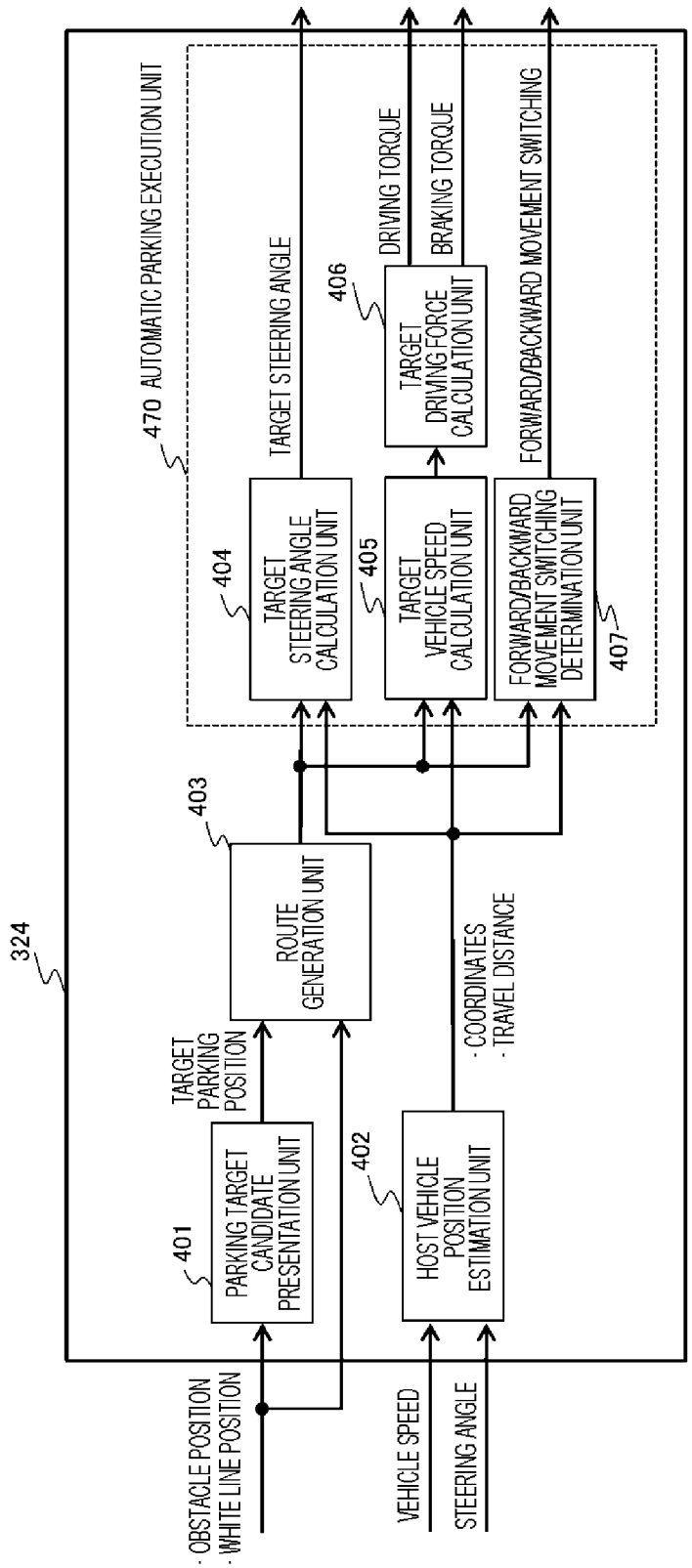
FIG. 3A is a block diagram illustrating the first embodiment of the present invention and an example of a function of the vehicle control device.

An example of a function of the vehicle control device 324 according to the first embodiment of the present invention is illustrated in a block diagram of FIG. 3A.

A parking target candidate presentation unit 401 calculates a space (target parking position) available for parking on the basis of a position of an obstacle, a position of a white line, and the like obtained from the surrounding situation recognition sensor 325, outputs a candidate for the target parking position to the input/output device 327, and presents the candidate to the driver.

Specifically, candidates for the target parking position are displayed as a parking frame or the like on a screen of the input/output device 327 or the like, and the driver selects a position at which to park the vehicle from among the candidates for the target parking position by touch input or the like on the screen of the input/output device 327.

When calculating the candidate for the target parking position, the parking target candidate presentation unit (travelable area setting unit) 401 calculates a travelable area as an area where the vehicle 300 can travel from a position of an obstacle, a position of a white line, and the like acquired from the surrounding situation recognition sensor 325. Note that, as a method of calculating the target parking position and a travelable area 104, a well-known or publicly-known technique may be applied.

When automatic parking is started, a host vehicle position estimation unit 402 calculates a host vehicle position, specifically, coordinates, a travel distance, and the like, of the vehicle 300 on the basis of the vehicle speed information acquired from the vehicle speed sensor 326, the steering angle acquired by the steering angle sensor 315, and the travelable area calculated by the parking target candidate presentation unit 401. Note that, instead of the vehicle speed sensor 326, a distance may be calculated from a value of the wheel speed sensor (not illustrated).

Based on the target parking position, the travelable area, and the position of an obstacle, a route generation unit 403 calculates a travel route (planned travel route) on which the vehicle can move from the automatic parking start position to the target parking position without contacting the obstacle (the outer periphery of the travelable area).

When generating the travel route, the route generation unit 403 outputs curvature information, a steering wheel turn-back position, and the like with respect to the travel distance. The travel route generated by the route generation unit 403 includes a steering wheel turn-back position at which a traveling direction is switched from forward movement to backward movement (or from backward movement to forward movement).

Further, when a step is detected on the travel route, the route generation unit 403 determines whether the step has a height that the vehicle can pass over. The route generation unit 403 does not set the step as an obstacle when determining that the vehicle can run over the step, and sets the step as an obstacle when determining that the vehicle cannot run over the step.

A target steering angle calculation unit 404 calculates a target steering angle on the basis of curvature information with respect to the travel distance on the basis of the travel route which is an output result of the route generation unit 403 and the host vehicle position which is an output of the host vehicle position estimation unit 402, and transmits the target steering angle to the steering control device 322. Here, the target steering angle is not limited to an output result of the route generation unit 403, and may be one obtained by adding a correction value of a steering amount in a case where a relative relationship with the parking frame or the obstacle is shifted during the automatic parking.

A target vehicle speed calculation unit 405 determines a reference target vehicle speed based on the magnitude of the curvature, the position of the obstacle, and the like based on the travel route that is an output result of the route generation unit 403 and the host vehicle position that is an output of the host vehicle position estimation unit 402.

When the reference target vehicle speed changes, the target vehicle speed calculation unit 405 realizes smooth acceleration and deceleration by correcting the target vehicle speed in consideration of acceleration and further a jerk. Note that the target vehicle speed calculation unit 405 sets a plurality of target vehicle speeds in advance as the reference target vehicle speed used in automatic parking as described later.

The target vehicle speed calculation unit 405 reduces the target vehicle speed when the surrounding situation recognition sensor 325 detects a step, a wheel stopper, or the like on the travel route after automatic parking is started. In this manner, parking can be performed without giving an uncomfortable shock to the driver when the vehicle passes over the step or comes into contact with the wheel stopper.

A target driving force calculation unit 406 calculates a necessary driving force (or braking force) based on a difference between the target vehicle speed and the vehicle speed information (actual vehicle speed). The target driving force calculation unit 406 transmits braking torque to the brake control device 321 in a case where a braking force is generated, and transmits driving torque to the driving force control device 320 in a case where a driving force is generated. Note that, in a case where the driving force generation mechanism 310 includes a motor, the braking torque can be transmitted to the driving force control device 320.

The target driving force calculation unit 406 corrects the driving force when a gradient, a step, or the like is detected by the surrounding situation recognition sensor 325. Specifically, the target driving force calculation unit 406 corrects the driving force so that the driving force becomes large in a case of an upward gradient, and the target driving force calculation unit 406 corrects the driving force so that the driving force becomes small (or negative) in a case of a downward gradient.

Further, when the surrounding situation recognition sensor 325 detects a step or the like, the target driving force calculation unit 406 performs correction such that the higher the step, the larger the driving force becomes. In this manner, the target driving force calculation unit 406 can improve followability to the target vehicle speed.

A forward/backward movement switching determination unit 407 commands the transmission control device 323 to switch forward or backward movement based on the steering wheel turn-back position on the travel route, which is an output result of the route generation unit 403, and the host vehicle position, which is an output of the target vehicle speed calculation unit 405. Note that, in a case where the driving force generation mechanism 310 is a motor, a command for switching a rotation direction only needs to be transmitted to the driving force generation mechanism 310.

The target steering angle calculation unit 404, the target vehicle speed calculation unit 405, the target driving force calculation unit 406, and the forward/backward movement switching determination unit 407 constitute an automatic parking execution unit 470 that controls the vehicle 300 toward the target parking position along the calculated travel route.

Figure 3B:
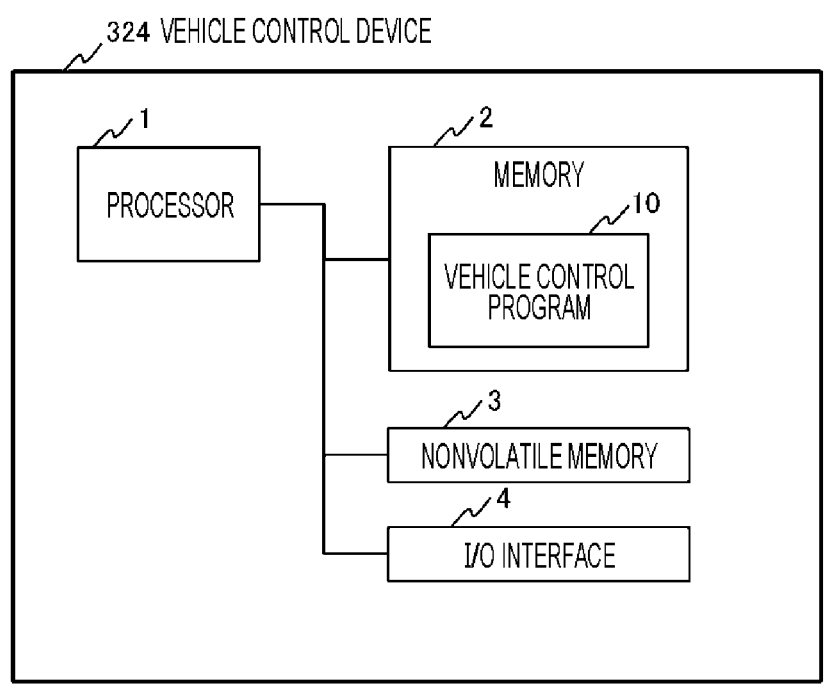
FIG. 3B is a block diagram illustrating the first embodiment of the present invention and an example of a configuration of the vehicle control device.

FIG. 3B is a block diagram illustrating an example of a configuration of the vehicle control device 324. The vehicle control device 324 includes a processor 1, a memory 2, a nonvolatile memory 3, and an I/O interface 4.

A vehicle control program 10 is loaded into the memory 2 and executed by the processor 1. The nonvolatile memory 3 stores a program and data. The I/O interface 4 is connected to various sensors and a network. Communication with another control device is performed via the I/O interface 4.

The vehicle control program 10 includes functional units of the parking target candidate presentation unit 401, the host vehicle position estimation unit 402, the route generation unit 403, the target steering angle calculation unit 404, the target vehicle speed calculation unit 405, the target driving force calculation unit 406, and the forward/backward movement switching determination unit 407 illustrated in FIG. 3A.

The processor 1 operates as a functional unit that provides a predetermined unit by executing processing according to a program of each functional unit. For example, the processor 1 functions as the route generation unit 403 by executing processing according to a route generation program. The same applies to other programs. Furthermore, the processor 1 also operates as a functional unit that provides each unit of a plurality of pieces of processing executed by each program.

Figure 4:
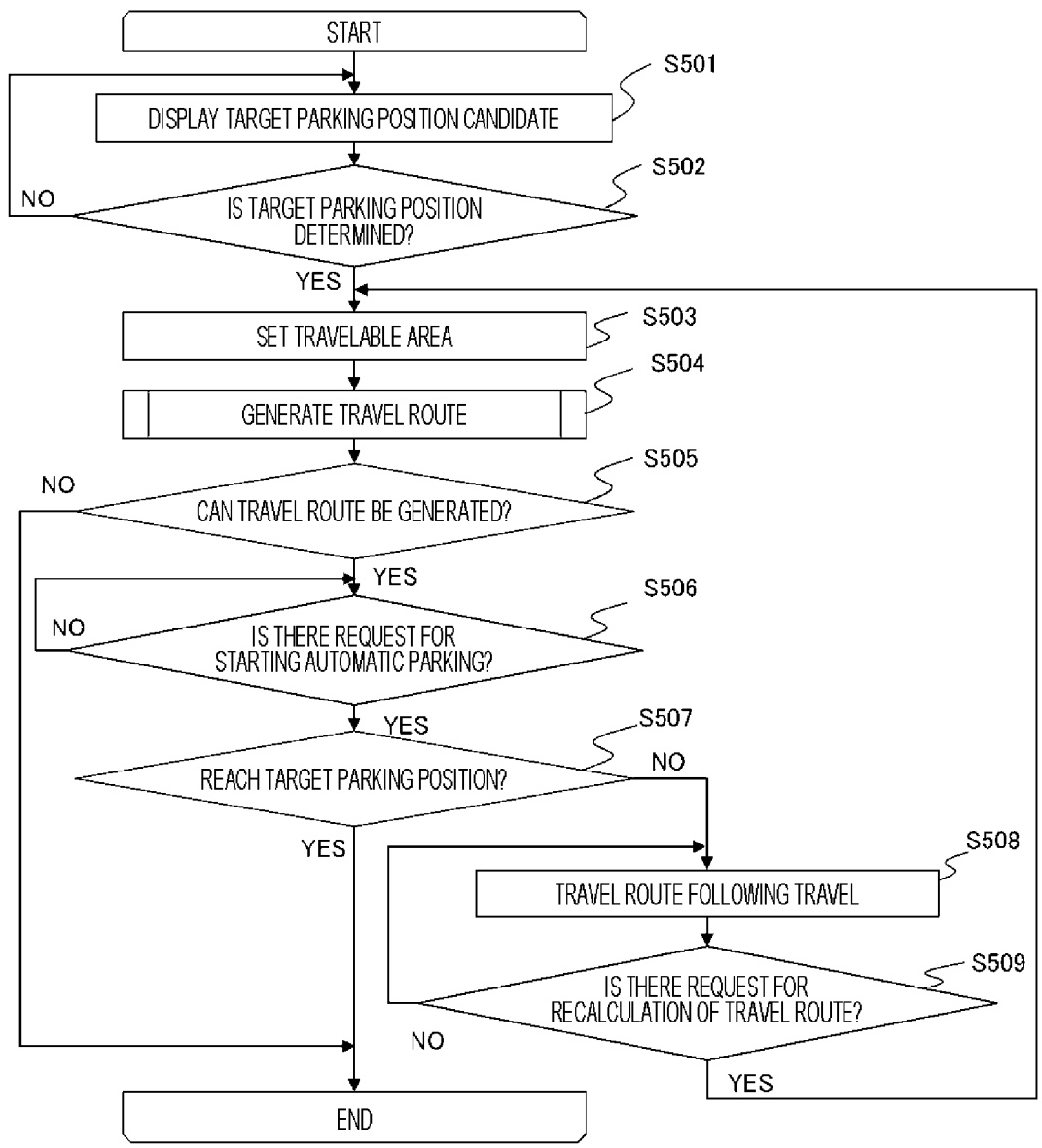
FIG. 4 is a flowchart showing the first embodiment of the present invention and an example of processing performed by the vehicle control device.

Content of the control of the vehicle control device 324 according to the first embodiment of the present invention will be described with reference to a flowchart of FIG. 4. This processing is executed in a case where a command for automatic parking is received from the input/output device 327.

In Step S501, the parking target candidate presentation unit 401 calculates a space available for parking on the basis of the information on a parking frame detected by the surrounding situation recognition sensor 325 and vacant space information without an obstacle.

In a case where a space available for parking is calculated, the parking target candidate presentation unit 401 displays the space on the input/output device 327 as a candidate for the target parking position. Note that, in a case where a space available for parking is not calculated, the parking target candidate presentation unit 401 ends the processing.

In Step S502, if the parking target candidate presentation unit 401 receives a target parking position selected by the driver from among the candidates for the target parking position via the input/output device 327, the processing proceeds to Step S503, and if not, the processing waits.

Figure 5A:
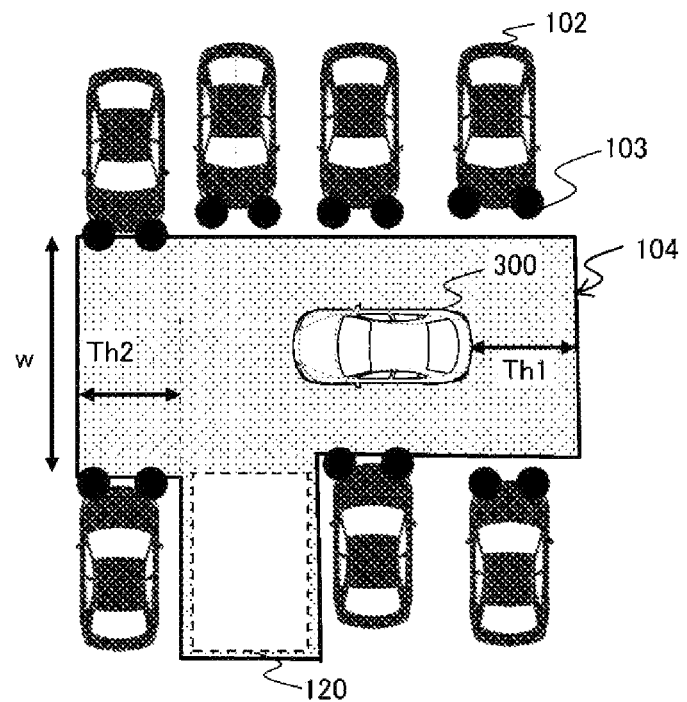
FIG. 5A is a plan view illustrating the first embodiment of the present invention and an example of setting of a travelable area based on a position of an obstacle.

In Step S503, the route generation unit 403 sets the travelable area 104 based on the selected target parking position and position information 103 of an obstacle 102 (see FIG. 5A) acquired by the surrounding situation recognition sensor 325. FIG. 5A is a plan view illustrating an example of the travelable area 104.

Specifically, the route generation unit 403 sets an area obtained by deforming a T shape as the travelable area 104 with the position information of the obstacle 102 closest to the vehicle 300 as an end point so that the area is approximated to a T-shaped planar shape including the parking frame 120 as the target parking position as illustrated in FIG. 5A. Note that the parking frame 120 is set as a frame capable of enclosing the vehicle 300. The vehicle control device 324 can display the parking frame 120 as the target parking position on the input/output device 327 or the navigation device 328.

For example, the route generation unit 403 sets the rear end of the travelable area 104 at a position away from the position of the vehicle 300 at the start of automatic parking by a predetermined value Th1 for the rear between the front and the rear of the vehicle 300 where none of the obstacle 102 exists or is detected, and sets the front end of the travelable area 104 at a position away from the left end of the parking frame 120 in the diagram by a predetermined value Th2 for the front.

Here, it is desirable to set a value larger than zero to the predetermined value Th1. However, in a case where there is a standby vehicle following the vehicle 300, the route generation unit 403 sets zero to Th1 to prevent approaching to the following standby vehicle so as not to give a sense of discomfort to the driver.

Further, the predetermined value Th2 is desirably set to a value larger than zero, and the route generation unit 403 may change the predetermined value Th2 depending on a passage width W. Specifically, the larger the passage width W, the smaller the distance of the predetermined value Th2 is set. In this manner, the route generation unit 403 can generate a more natural travel route without extending the travel route in the forward direction.

Figure 5B:
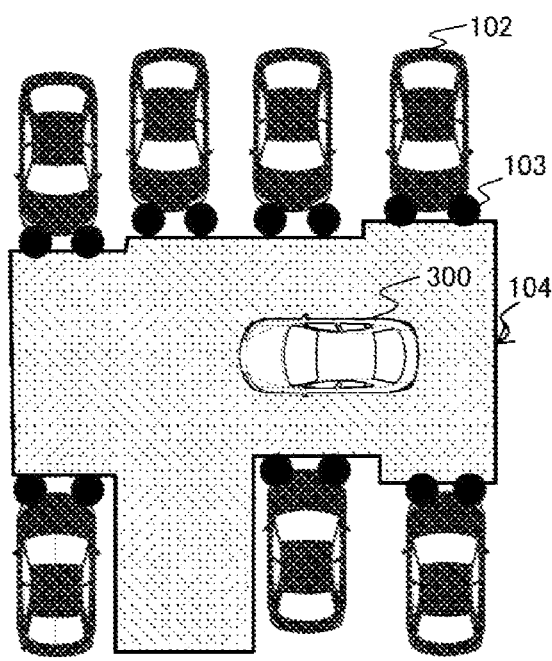
FIG. 5B is a plan view illustrating the first embodiment of the present invention and an example of setting of the travelable area based on a position of an obstacle.
Figure 5C:
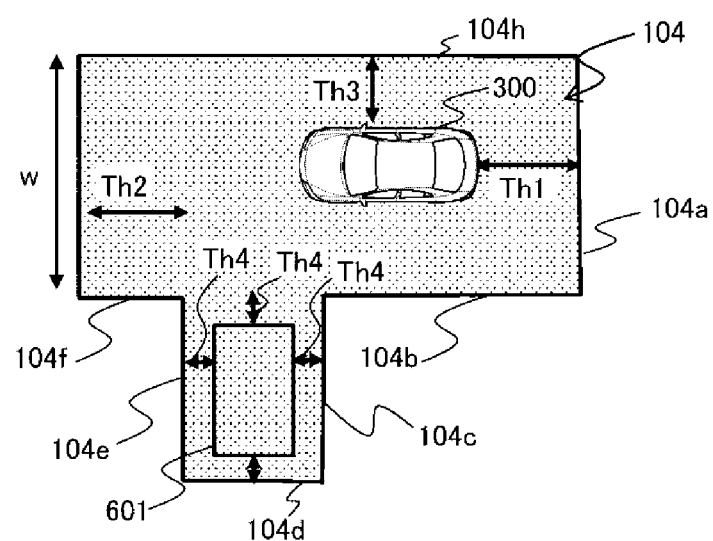
FIG. 5C is a plan view illustrating the first embodiment of the present invention and an example of setting of the travelable area based on a position of an obstacle.

FIG. 5C is a plan view illustrating an example of the travelable area 104. As illustrated in FIG. 5C, in a case where there is none of the obstacle 102 and only a target parking frame 601 is determined, an area up to a position laterally away from the position of the vehicle 300 by a predetermined value Th3 is set as the travelable area 104.

Here, the predetermined value Th3 is set based on a detection distance of the surrounding situation recognition sensor 325. Further, a line segment (104*c*, 104*d*, and 104*e*) on the target parking frame 601 side as a target is set at a position away from the target parking frame 601 by a predetermined value Th4. Here, all the predetermined values Th4 from the line segments 104*c* to 104*d* are not limited to the same value, and may be set to different values.

As described above, the reason why the travelable area 104 is formed in a T shape is to reduce a calculation load of route calculation and the like. However, in a case where the performance of a computer of the vehicle control device 324 is high and there is no problem even if the calculation load is high, the shape is not limited to a T shape, and, as illustrated in FIG. 5B, an area approximated to a polygon may be set as the travelable area 104 on the basis of the position information 103 of each of the obstacle 102. Hereinafter, description will be made using a T-shaped area as the travelable area 104.

In Step S504, the route generation unit 403 calculates a travel route planned to travel from the current position of the host vehicle to the target parking position on the basis of the target parking position and the travelable area 104. A specific method of calculating the travel route will be described with reference to FIGS. 6 to 15.

Figure 6:
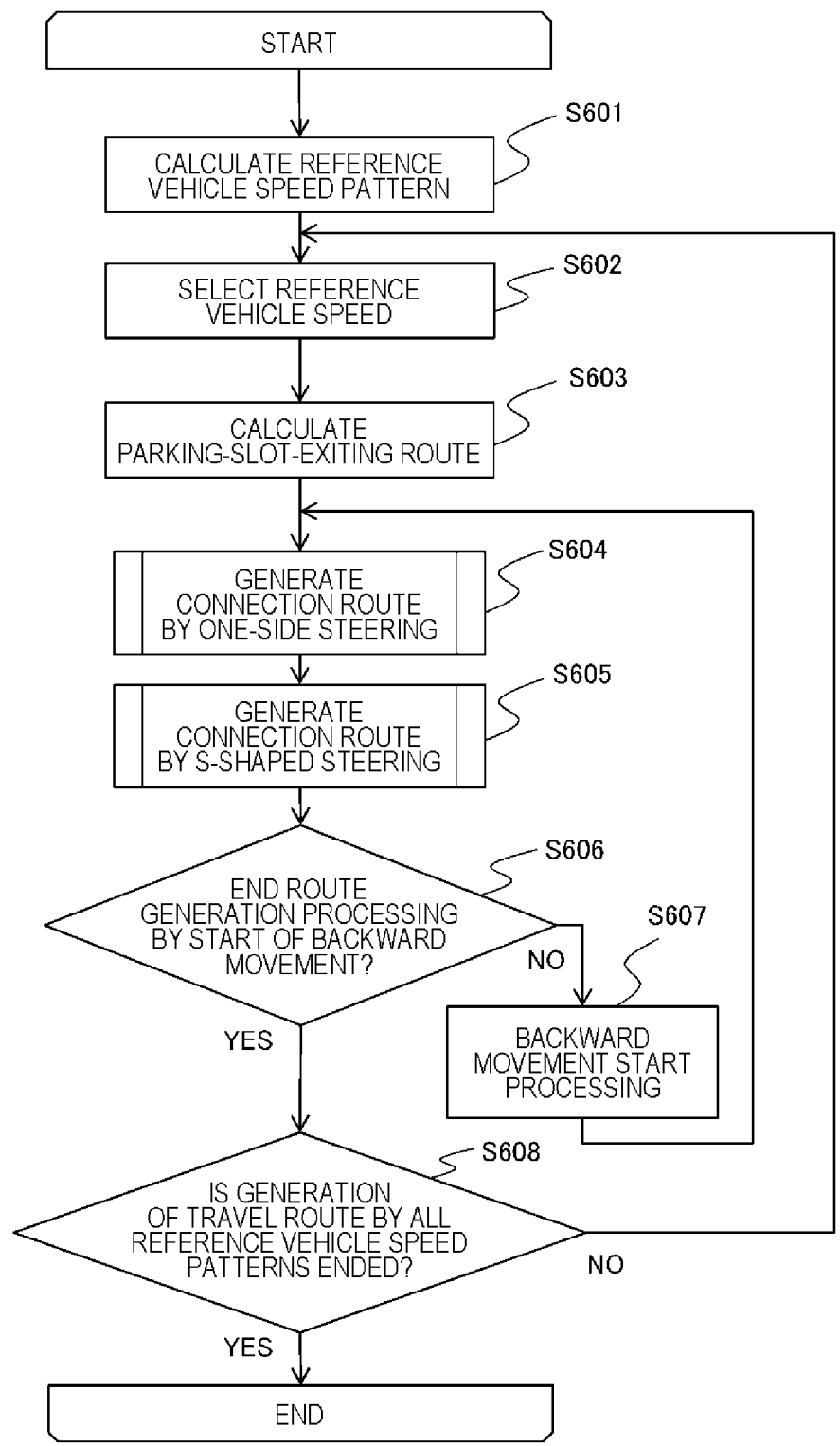
FIG. 6 is a flowchart showing the first embodiment of the present invention and an example of travel route generation processing.

FIG. 6 is a flowchart showing an example of travel route generation processing. This processing is performed in Step S504 in FIG. 4.

In Step S601, the route generation unit 403 calculates a reference vehicle speed pattern Vbase of when the vehicle 300 travels on the travel route. Specifically, when an upper limit vehicle speed Vmax is set as a reference with respect to the travelable area 104, and the vehicle speed is decreased at a predetermined interval Vd and is set to a minimum vehicle speed Vmin, a reference vehicle speed pattern Vbase is generated as shown in Equation (1) below.

[Equation 1]

$$V_{base} = [V_{max}, V_{max} - V_d, \ldots V_{min}] \quad (1)$$

Note that the upper limit vehicle speed Vmax and the lower limit vehicle speed Vmin are preset values. Here, the route generation unit 403 sets the upper limit vehicle speed Vmax to be smaller as the passage width W is narrower and the distance between an obstacle and the host vehicle position is shorter. In this manner, the vehicle speed can be lowered in a situation where the passage is narrow or when the distance to an obstacle is short, and a sense of discomfort of the driver can be alleviated.

Further, the route generation unit 403 sets a value for backward movement to be smaller than a value for forward movement with respect to the upper limit vehicle speed Vmax, so that it is possible to reduce the vehicle speed at the time of backward movement when it is difficult for the driver to check the surrounding situation, and it is possible to alleviate a sense of discomfort of the driver. Furthermore, even at the same curvature, the higher the vehicle speed, the greater the lateral acceleration becomes. Therefore, the route generation unit 403 sets the reference vehicle speed to be smaller as the curvature is larger. In this manner, it is possible to improve drivability without providing an excessive lateral acceleration to the driver.

Further, the route generation unit 403 decreases the vehicle speed in an environment where it is difficult for the driver to visually recognize the surrounding situation of the vehicle. Specifically, the route generation unit 403 sets the vehicle speed low when detecting a situation where the illuminance of the surrounding environment is low on the basis of sensor information acquired from an illuminance sensor (not illustrated) or the surrounding situation recognition sensor 325 or when detecting raindrops by a wiper signal or the surrounding situation recognition sensor 325. By lowering the vehicle speed in a situation where it is difficult for the driver to recognize the surrounding situation, a sense of discomfort of the driver can be suppressed.

In Step S602, the route generation unit 403 selects one reference vehicle speed for which the route generation processing is not completed from a plurality of the calculated reference vehicle speed patterns, and executes the route generation processing below for the selected reference vehicle speed.

Figure 7:
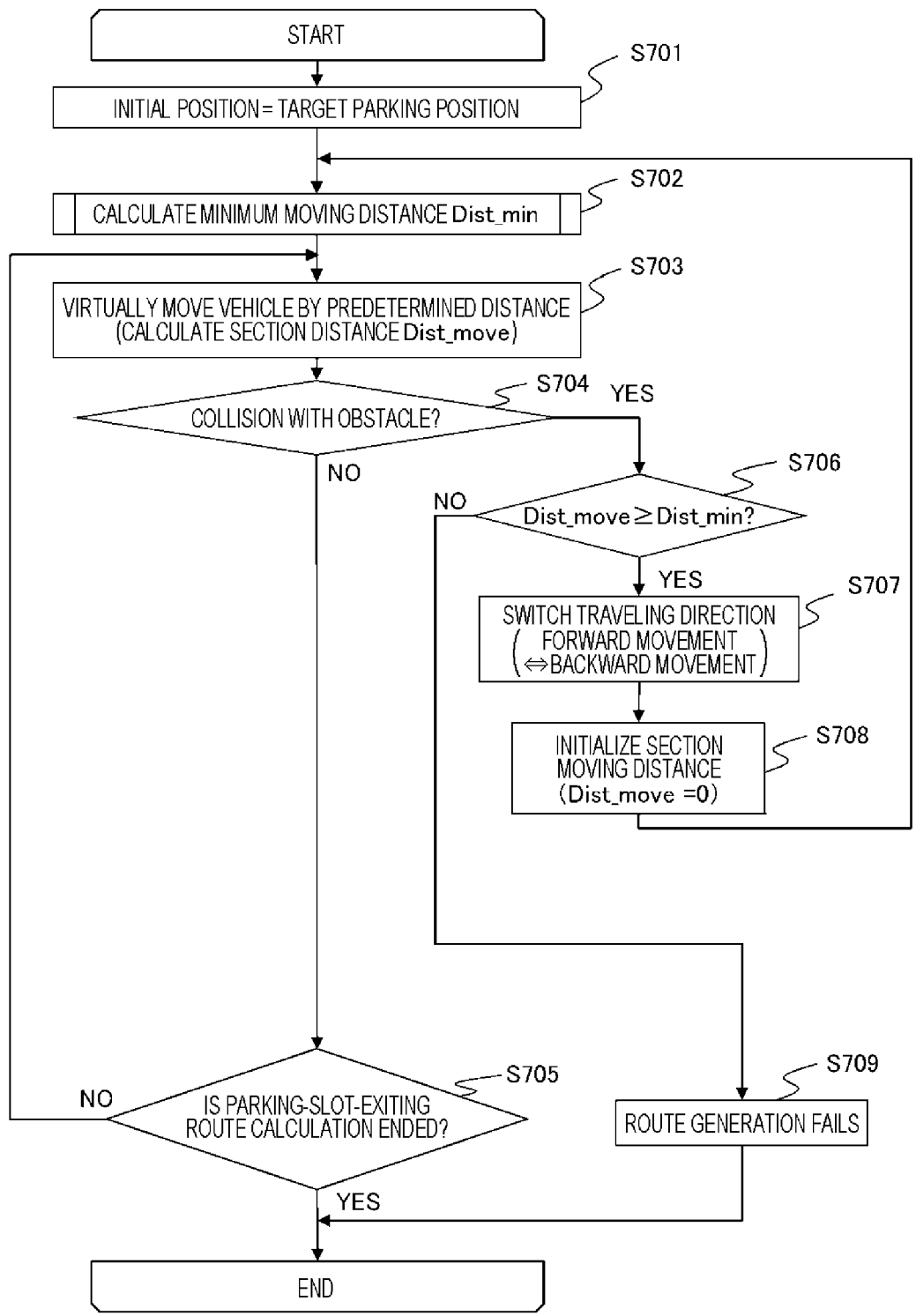
FIG. 7 is a flowchart showing the first embodiment of the present invention and an example of parking-slot-exiting route calculation processing.

Parking-slot-exiting route calculation in Step S603 will be described with reference to FIGS. 7 to 11. FIG. 7 illustrates a flowchart of the parking-slot-exiting route calculation.

In Step S701, the route generation unit 403 virtually arranges the vehicle 300 at the target parking position as an initial position.

In Step S702, the route generation unit 403 calculates a minimum moving distance Dist_min with respect to a vehicle position. Note that the calculation of the minimum moving distance Dist_min will be described in detail with reference to FIG. 9.

Figure 8A:
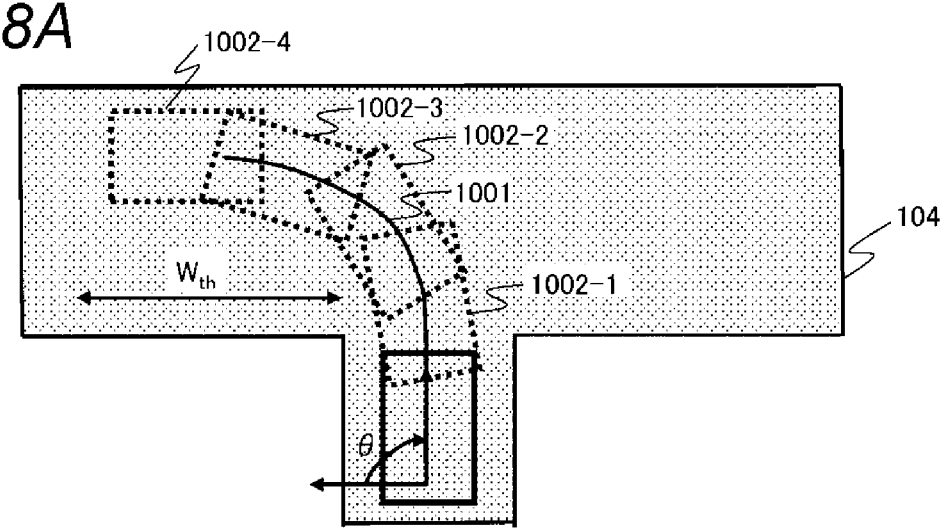
FIG. 8A is a plan view illustrating the first embodiment of the present invention and illustrating an example of a result of the parking-slot-exiting route calculation.

In Step S703, the route generation unit 403 moves the vehicle 300 from the target parking position by a predetermined distance. Specifically, as illustrated in FIG. 8A, a travel route 1001 in which the vehicle 300 can exit from a parking slot by turning without coming into contact with the obstacle 102 in the travelable area 104 from the state of being arranged at the target parking position is calculated. Note that, in FIG. 8A, positions 1002-1 to 1002-4 of the vehicle on the travel route 1001 are illustrated.

Here, in order to shorten a total length of the travel route 1001, it is desirable that the route generation unit 403 sequentially calculate the parking-slot-exiting route with reference to a minimum turning radius at the time of turning. However, the parking-slot-exiting route may be calculated by increasing the radius at the time of turning.

Furthermore, the route generation unit 403 may set the radius at the time of turning to be larger as the road width is wider. In this manner, when the parking space is large, the drivability is improved with gentle turning. Further, in the present step, the vehicle 300 is added by a predetermined distance from the target parking position, and the sum of moving distances is recorded as a section moving distance Dist_move.

Note that a section in automatic parking indicates a travel route from start (automatic parking start position) to stop (steering wheel turn-back position or target parking position), and the travel route from the automatic parking start position to the target parking position includes one or more sections. Further, in a case where a plurality of steering wheel turn-back positions are included, a start point and an end point of a section can be set as the steering wheel turn-back position. Further, in a case where the distance from the automatic parking start position to the target parking position is long, distances obtained by dividing the travel route by a predetermined time unit can be set as sections.

In Step S704, the route generation unit 403 determines whether or not the vehicle collides with an obstacle at a vehicle position moved by a predetermined distance. In a case where there is a collision, the processing proceeds to Step S706, and in a case where there is no collision, the processing proceeds to Step S705.

In Step S705, the route generation unit 403 determines whether or not to end the parking-slot-exiting route calculation.

When an end condition of the parking-slot-exiting route calculation is satisfied, the parking-slot-exiting route calculation is ended, and when the condition is not satisfied, the processing returns to Step S703, and the processing is repeated by further moving the vehicle position by a predetermined distance until the condition of ending the parking-slot-exiting route calculation is satisfied.

Here, the end condition of the parking-slot-exiting route calculation includes a plurality of conditions, such as a condition that a vehicle body center line of the vehicle 300 is perpendicular to a parking azimuth and is parallel to the azimuth of the passage, and a condition that the vehicle reaches a point separated from the target parking position by a predetermined distance Wth as illustrated in FIG. 8A, for example. The route generation unit 403 performs the parking-slot-exiting route calculation until at least one of a plurality of end conditions is satisfied.

In Step S706, the route generation unit 403 compares the section moving distance Dist_move with the minimum moving distance Dist_min. In a case where the section moving distance Dist_move is equal to or more than the minimum moving distance Dist_min, the route length of the section satisfies the minimum moving distance. Therefore, the section is employed as the travel route, and the processing proceeds to Step S707.

On the other hand, in a case where the section moving distance Dist_move is less than the minimum moving distance Dist_min, the route length of the section does not satisfy the minimum moving distance. Therefore, the route generation unit 403 does not employ the section as the travel route, and ends the parking-slot-exiting route calculation as route generation failure (S709).

Figure 8B:
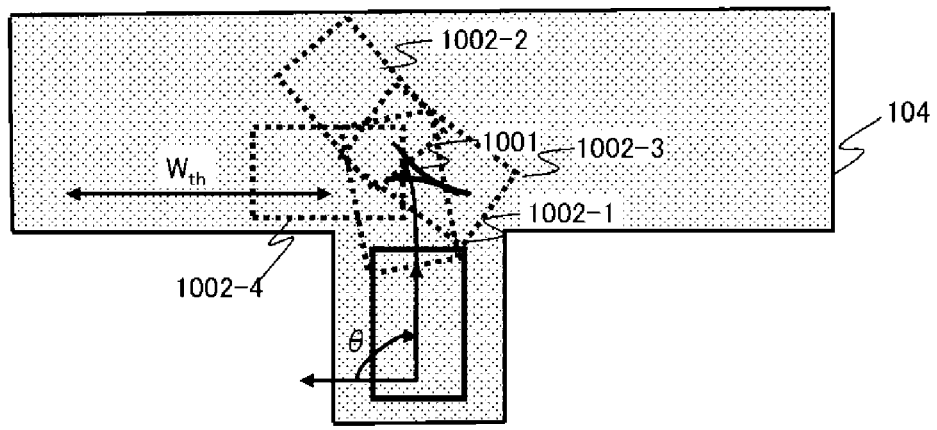
FIG. 8B is a plan view illustrating the first embodiment of the present invention and illustrating an example of a result of the parking-slot-exiting route calculation.

In Step S707, since the vehicle collides with an obstacle at the vehicle position, the traveling direction is switched and the parking-slot-exiting route calculation is continued. Specifically, as illustrated in FIG. 8B, when the travelable area 104 is narrow, it is necessary to turn back the steering wheel at the position 1002-2 where the vehicle collides with the obstacle during the parking-slot-exiting route calculation. The route generation unit 403 steers to the opposite from the position to switch the traveling direction of the vehicle 300.

In Step S708, the route generation unit 403 initializes the section moving distance Dist_move since the movement in the section to be processed has ended.

The route generation unit 403 repeats the above processing, and, as illustrated in FIG. 8B, in a case where the vehicle collides with the obstacle again, the route generation unit 403 performs the steering wheel turn-back again at the position 1002-3, and ends the parking-slot-exiting route calculation at the position 1002-4 where the end condition of the parking-slot-exiting route calculation is satisfied without collision with the obstacle.

As a result, as illustrated in FIG. 8B, the route generation unit 403 generates the travel route (parking-slot-exiting route) 1001 in consideration of the steering wheel turn-back.

Figure 9:
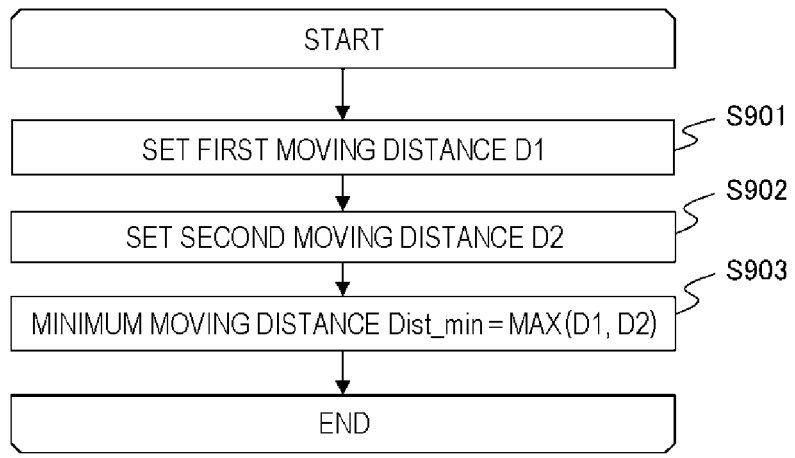
FIG. 9 is a flowchart showing the first embodiment of the present invention and an example of minimum moving distance calculation processing.

Minimum moving distance calculation performed in Step S702 in FIG. 7 will be described with reference to FIGS. 9 to 11. FIG. 9 is a flowchart of processing of calculating a minimum moving distance.

In Step S901, the route generation unit 403 sets a first moving distance D1. The first moving distance D1 is a request value related to vehicle control, and is set depending on predetermined vehicle specifications. As an example, determination is made based on the position accuracy of the host vehicle that can be detected by the vehicle control device 324.

The position of the vehicle 300 is estimated using at least one or more of one using a wheel speed sensor, one using a motor angle sensor, a high-precision GPS, and the like. Since the position accuracy of the sensor is, for example, about 0.01 to 0.1 [m], the route generation unit 403 calculates a minimum value Ds of the moving distance on the basis of these values. Note that the minimum value Ds is a controllable minimum moving distance.

Further, when controlling the speed of the vehicle 300, it is difficult to control the speed at a low vehicle speed or less due to controllability of the actuator, a road condition, and the like, and therefore, it is necessary to control the speed at a predetermined value or more. However, in order to set the jerk to a predetermined value or less in consideration of ride comfort, the speed track of the vehicle needs to be gradually increased as shown in FIG. 10. Note that FIG. 10 is a graph showing a relationship between a vehicle speed, a moving distance, and time.

Figure 10:
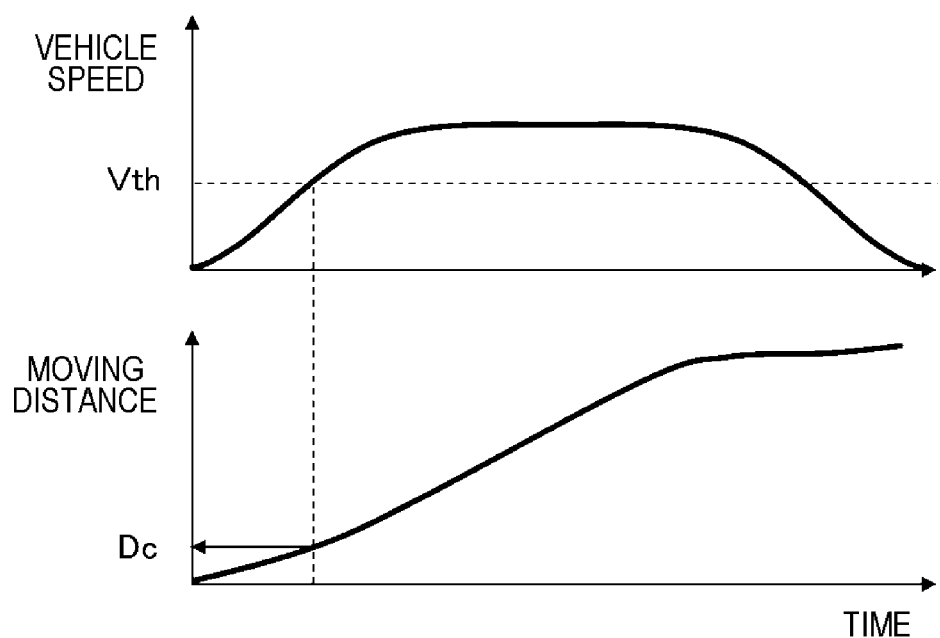
FIG. 10 is a view illustrating the first embodiment of the present invention and an example of a first moving distance.
Figure 11:
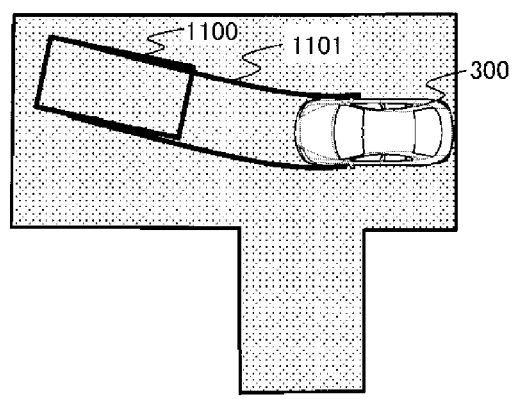
FIG. 11 is a plan view illustrating the first embodiment of the present invention and an example of a second moving distance.

In consideration of these, in order to have a vehicle speed equal to or more than the predetermined value Vth, it is necessary to set the moving distance equal to or more than Dc in FIG. 10. Note that the moving distance Dc indicates a minimum moving distance with reference to a vehicle speed at which the actual vehicle speed becomes equal to or more than the predetermined value Vth at the reference vehicle speed selected in Step S602.

Further, in a case where there is a gradient in the road condition, specifically, in the travelable area 104, controllability of the vehicle 300 becomes more difficult. Therefore, the predetermined value Vth of the vehicle speed may be set to be larger as the magnitude of the gradient is larger. Based on the above, the route generation unit 403 selects and sets a larger one of the minimum value Ds and the moving distance Dc to the first moving distance D1.

As described above, the larger one of the minimum value Ds based on the control accuracy and the moving distance Dc based on the predetermined value Vth of the vehicle speed is set to the first moving distance D1.

In Step S902, the route generation unit 403 sets a second moving distance D2. The second moving distance D2 is a request value for enabling the driver to perceive a next operation (movement) of automatic parking, and is a value (distance) set in advance based on a display method of a route or the like. Specifically, as illustrated in FIG. 11, the display device displays a next steering wheel turn-back position 1100 and a vehicle track 1101 until the position is reached.

Here, in order to make the driver perceive the movement of a front wheel, that is, the movement of the steering 313, a movement track (plan) of the front wheel is displayed as the vehicle track 1101. Based on these, the second moving distance D2 is set to at least a distance from a front wheel position to a vehicle end point with respect to the traveling direction so that the driver can perceive the track of the front wheel. At this time, the value of the second moving distance D2 may be changed according to the shape of the travel route. Specifically, since the movement track of the front wheel is more easily visually recognizable in a turning track than in a straight track, the distance may be set to be longer than that of the turning track in the case of the straight track.

In Step S903, a larger one of the first moving distance D1 and the second moving distance D2 is set as the minimum moving distance Dist_min, and the present processing is ended.

Returning to FIG. 6, in Step S604, the route generation unit 403 generates a connection route by one-side steering. The route generation unit 403 determines whether connection can be made to the position 1002 (see FIGS. 8A and 8B) calculated by the parking-slot-exiting route from the current vehicle position by one-side steering, and stores route information in a case where connection can be made.

Figure 12:
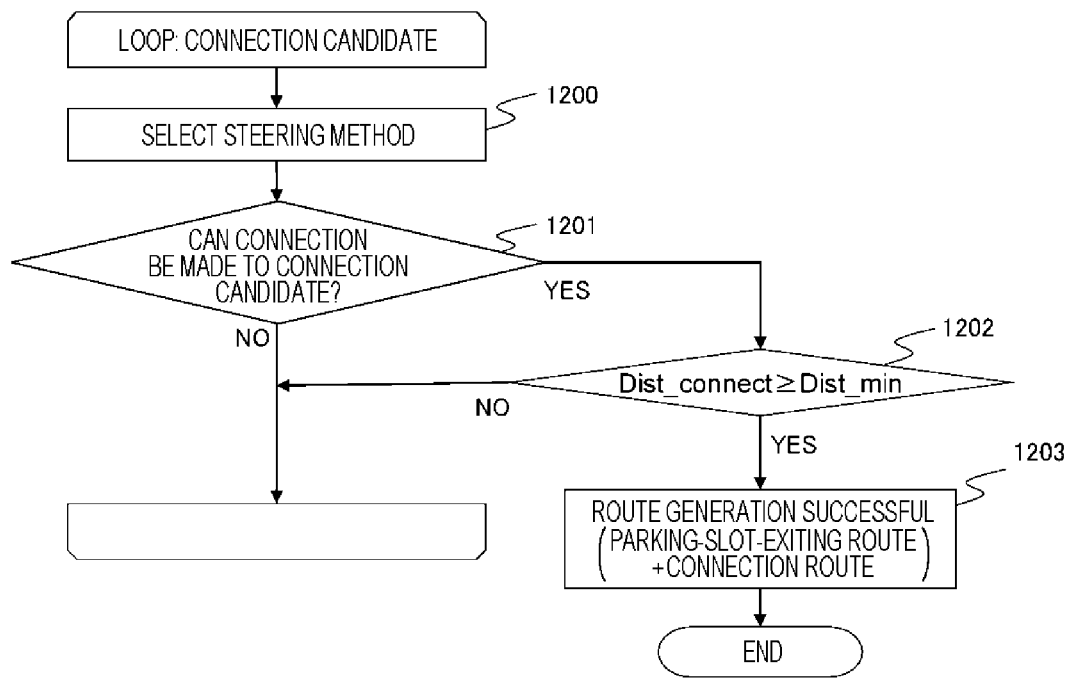
FIG. 12 is a flowchart showing the first embodiment of the present invention and an example of connection determination processing.

Here, the route generation unit 403 does not determine whether or not connection can be made for all the positions 1002-1 to 1002-4 in FIGS. 8A and 8B calculated in the parking-slot-exiting route, and performs determination as to whether or not connection can be made to, as a connection candidate position, the position 1002-3 where the change in the angle (vehicle body center line) of the vehicle 300 is larger than that in the angle (vehicle body center line) of the vehicle 300 at the automatic parking start position. In this manner, the route generation unit 403 can generate a route that does not cause a sense of discomfort for the driver. Specific processing content will be described with reference to FIG. 12. FIG. 12 is a flowchart showing an example of connection determination processing performed in Steps S604 and S605 in FIG. 6.

Figure 13:
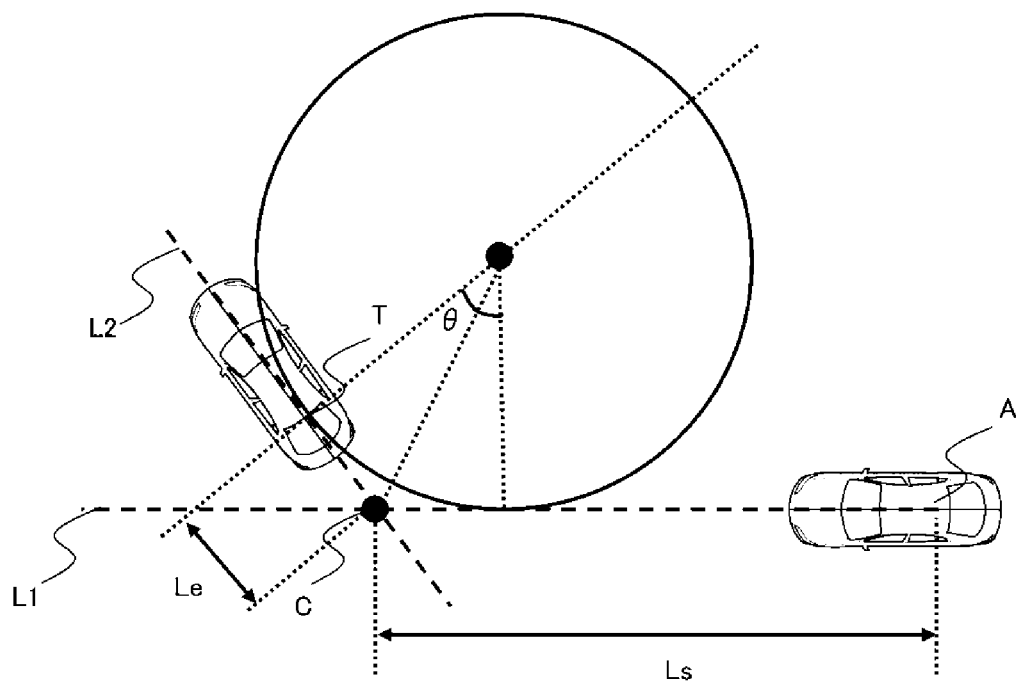
FIG. 13 is a plan view illustrating the first embodiment of the present invention and illustrating a connection route by one-side steering.

In Step S1200, the route generation unit 403 selects either one-side steering or S-shaped steering as a steering method from the automatic parking start position to the connection candidate position. Here, the one-side steering refers to operation of turning the steering of the host vehicle 300 to only one of the left and right sides. FIG. 13 is a plan view illustrating an example of connection by one-side steering.

In Step S1201, whether or not connection can be made to the connection candidate by the steering method selected by the route generation unit 403 is determined, and in a case where connection can be made, the processing proceeds to S1202, and in a case where connection is not possible, determination is performed for a next connection candidate.

Specifically, in order to generate a travel route by one-side steering from a current position A (FIG. 13) to a reaching target position T, the route generation unit 403 calculates a distance Ls between an intersection C between an axis L1 and an axis L2 and the automatic parking start position A and a distance Le between the intersection C and the reaching target position T as illustrated in FIG. 13.

The route generation unit 403 selects a distance of a shorter one (in the example illustrated in FIG. 13, the distance Le is selected.). Then, the route generation unit 403 draws an arc having the two axes L1 and L2 as a common tangent and passing through a position away from the intersection C by a shorter distance. A radius R of the circle at that time is calculated by Equation (2) below.

[Equation 2]

$$R = \frac{L_e}{\tan\frac{\theta}{2}} \quad (2)$$

As described above, the route generation unit 403 can generate a route from the start position A for automatic parking to the reaching target position T by combining a straight line and an arc. Here, the connection by one-side steering is not limited to a straight line and an arc, and a route may be generated using a relaxation curve such as a clothoid.

In Step S1202, when a one-side steering connection route length Dist_connect from the automatic parking start position A to the reaching target position T is equal to or more than the minimum moving distance Dist_min, the route generation is determined to be successful, and the travel route (S603) calculated by calculation of the parking-slot-exiting route and the route calculated by generation of the connection route by one-side steering (S604) are stored in the route information as the travel route. In contrast, in a case where the one-side steering connection route length Dist_connect is less than the minimum moving distance Dist_min, connection to the connection candidate is prohibited, and a search for a next connection candidate is started.

In Step S605 of FIG. 6, the route generation unit 403 generates a connection route by S-shaped steering.

The route generation unit 403 determines whether or not connection can be made, by S-shaped steering, from the automatic parking start position A to the position 1002 (FIGS. 8A and 8B) calculated by the parking-slot-exiting route, and in a case where connection can be made, the route generation unit 403 stores the route information as the travel route in the route information.

Here, similarly to the determination of the connection by the one-side steering, the route generation unit 403 does not determine whether or not the connection is possible for all the positions 1002-1 to 1002-4 (FIGS. 8A and 8B) calculated in the parking-slot-exiting route, and performs the determination only for the positions 1002-1 to 1002-3 where the angle of the vehicle 300 is larger than the angle of the vehicle 300 at the automatic parking start position A as described above. In this manner, the route generation unit 403 can generate a travel route that does not cause a sense of discomfort for the driver.

Figure 14:
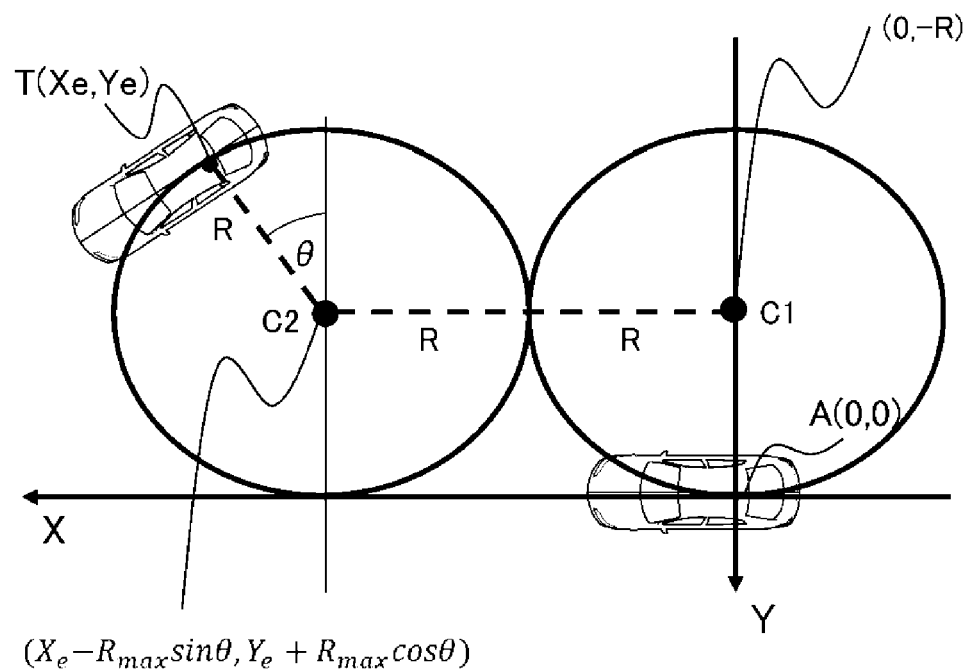
FIG. 14 is a plan view illustrating the first embodiment of the present invention and illustrating a connection route by S-shaped steering.

In order to generate a route by S-shaped steering from the automatic parking start position A to the reaching target position T, the route generation unit 403 calculates the radius R for drawing an S shape as shown in FIG. 14. FIG. 14 is a plan view illustrating a connection route by S-shaped steering.

Here, the route generation unit 403 can facilitate the calculation by setting a turning radius of S-shaped steering to the same radius R. However, a connection route by S-shaped steering may be generated using a different radius. By the route generation unit 403 using a different radius, the degree of freedom of the connection route by S-shaped steering is further increased, and it becomes easy to reach the reaching target position T. Hereinafter, an example of S-shaped steering using the same radius R will be described. In FIG. 14, since center coordinates C1 and C2 of each circle are calculated, a radius of a common circle is calculated by Equations (3) and (4) below from a distance between the center coordinates.

[Equation 3]

$$2R = \sqrt{(X_e - R\sin\theta)^2 + (Y_e + R\cos\theta + R)^2} \quad (3)$$

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (4)$$

The route generation unit 403 generates a connection route by S-shaped steering using the calculated turning radius R. Here, the connection by an S-shape is not limited to an arc, and the route generation unit 403 may generate a connection route using a relaxation curve such as a clothoid. As described above, by generating a connection route using not only one-side steering but also S-shaped steering, the degree of freedom of a travel route is increased and a connection route is easily generated.

In Step S606 of FIG. 6, the route generation unit 403 determines the end of the route generation processing by the start of backward movement. The route generation unit 403 proceeds to Step S607 if the route generation processing by the start of backward movement has not already been performed, and proceeds to Step S608 if the generation processing by the start of backward movement has already been completed.

Figure 15:
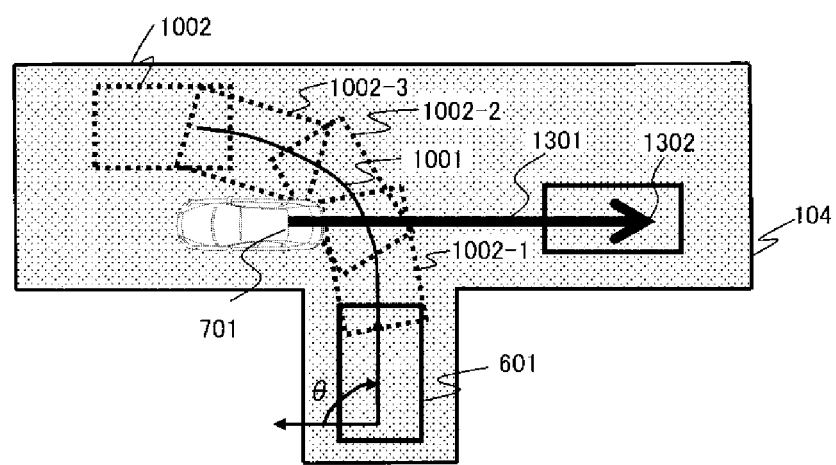
FIG. 15 is a plan view illustrating the first embodiment of the present invention and an example of backward movement start processing.

The backward movement start processing in Step S607 will be described with reference to FIG. 15. FIG. 15 is a plan view illustrating an example of the backward movement start processing. In a case where an automatic parking start position 701 passes the target parking frame 601, it is difficult to make connection to the route 1001 in which the vehicle can exit from a parking slot by one-side steering and S-shaped steering.

In view of the above, as illustrated in a backward movement route 1301 of FIG. 15, the route generation unit 403 searches for a connection route from a host vehicle position 1302 at which the vehicle has moved backward by a predetermined amount Dist_back to the route 1001 in which the vehicle can exit from a parking slot. In this manner, the travel route becomes compact, and a sense of discomfort for the driver can be reduced.

Here, the route generation unit 403 sets the predetermined amount Dist_back to be equal to or more than the minimum moving distance Dist_min. Furthermore, in a case where the automatic parking start position 701 is not parallel to the passage, the route generation unit 403 adjusts the angle of the vehicle at the time of backward movement so that the automatic parking start position 701 becomes parallel to the passage.

In this manner, the route generation unit 403 is likely to be successful in searching for a connection route to the vehicle position 1002 on a route in which the vehicle can exit from a parking slot at the time of a next forward movement. The route generation unit 403 executes generation of a connection route by one-side steering (S604) and generation of a connection route by S-shaped steering (S605) after moving the vehicle to the host vehicle position 1302 by the backward movement start processing (S607), and, in a case where the generation of a travel route is successful, the route generation unit 403 stores the route in the route information.

In Step S608, the route generation unit 403 determines whether or not the generation of the travel route by all the reference vehicle speed patterns has been completed. The route generation unit 403 generates a travel route by starting forward movement and backward movement for each reference vehicle speed pattern, and then ends the generation of a travel route candidate.

Next, returning to the flowchart of FIG. 4, processing below is executed.

In Step S505, in a case where the travel route can be generated in Step S504, the processing proceeds to Step S506, and in a case where the route generation unit 403 cannot generate the travel route for automatic parking, the present processing ends.

In Step S506, the vehicle control device 324 determines whether or not a request for starting automatic parking is received by the operation of the input/output device 327 by the driver. When the vehicle control device 324 receives the request for starting automatic parking, the processing proceeds to Step S507. Here, the request for starting automatic parking is not limited to input of the driver, and includes a request via communication from the outside of the vehicle 300 such as control.

In Step S507, the vehicle control device 324 travels by following the travel route and determines whether the vehicle 300 has been able to reach the target parking position T. The vehicle control device 324 ends the present processing when the host vehicle position has reached the target parking position T, or executes travel route following travel in Step S508 in a case where the host vehicle position has not been able to reach the target parking position T.

In Step S508, the vehicle control device 324 controls the vehicle so as to follow the travel route. Specifically, the steering is controlled on the basis of curvature information with respect to a moving distance from the automatic parking start position 701, and the driving force is controlled on the basis of speed information with respect to the moving distance from the automatic parking start position 701.

Further, at the steering wheel turn-back position, the vehicle control device 324 controls switching of a shift, and, in a case where stationary steering (in which steering is performed in a state where the vehicle is stopped) is necessary, switching of steering and a traveling direction.

In Step S509, the vehicle control device 324 determines whether or not a situation where the travel route is recalculated occurs during automatic parking. In a case of performing recalculation of the travel route, the vehicle control device 324 proceeds to Step S503, and performs setting of the travelable area 104 and recalculation of the travel route.

Here, the situation where the travel route is recalculated includes a case where the position of the obstacle 102 detected at the start of automatic parking greatly changes, a case where it is necessary to change the steering wheel turn-back position by intervention such as shift switching or brake operation by the driver, and the like.

The former is a case where, in a case where the position of the obstacle 102 detected at the start of automatic parking is far, automatic parking is started with poor distance accuracy, and when the vehicle approaches the obstacle 102, the distance is shorter than the position detected at the start of automatic parking. At that time, since the vehicle cannot reach the target parking position on the travel route at the start of automatic parking, it is necessary to recalculate the travel route. In the latter case, similarly, when the steering wheel turn-back position is changed, the vehicle cannot reach the target parking position on the route at the start of automatic parking, and the route needs to be recalculated.

As described above, according to the first embodiment, the route generation unit 403 can generate the travel route from the automatic parking start position to the target parking position for each of the reference vehicle speed pattern Vbase by combining one-side steering, S-shaped steering, or backward movement in units of sections. In this manner, it is easy for the driver to perceive the planned operation of automatic parking even for various automatic parking start positions, and it is possible to realize automatic parking in which the movement of the vehicle 300 is smooth.

Figure 1A:
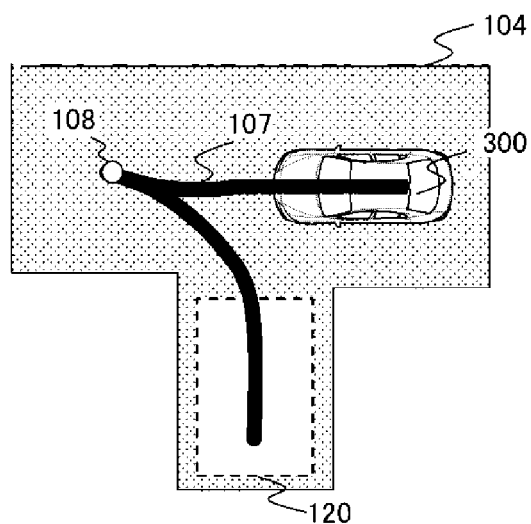
FIG. 1A is a view illustrating a problem to be solved by the present invention.
Figure 1B:
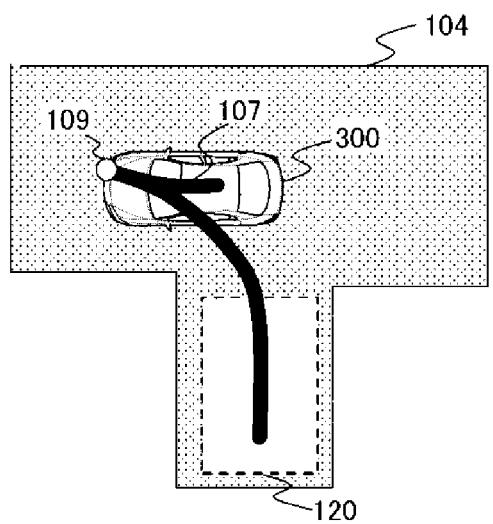
FIG. 1B is a view illustrating a problem to be solved by the present invention.

Furthermore, in the first embodiment, the travel route (section) generated by the route generation unit 403 is set to a minimum moving distance (Dc) based on a vehicle speed at which the actual vehicle speed is equal to or more than the predetermined value Vth, a minimum moving distance (Ds) in which control accuracy can be maintained, or the second moving distance D2 or more. In this manner, as illustrated in FIG. 1B, it is possible to prevent a distance from the automatic parking start position to the steering wheel turn-back position 109 from being set to be less than several rotations of a tire, prohibit the generation of the travel route in which the vehicle stops immediately after starting, and provide automatic parking without causing a sense of discomfort for the driver and the passenger.

Further, in the first embodiment, since the actual vehicle speed is accelerated to the predetermined value Vth or more, it is possible to avoid traveling at an extremely low speed as in the conventional embodiment and to ensure the control accuracy of automatic parking.

Note that, in the first embodiment described above, the example in which traveling by the vehicle control device 324 is started in a case where a command for automatic parking is received from the input/output device 327 is shown. However, the present invention is not limited to this. For example, the vehicle control device 324 can be connected to a mobile terminal via wireless communication, and an intervention command for starting automatic parking or a driving operation can be transmitted from the mobile terminal.

Second Embodiment

Figure 16:
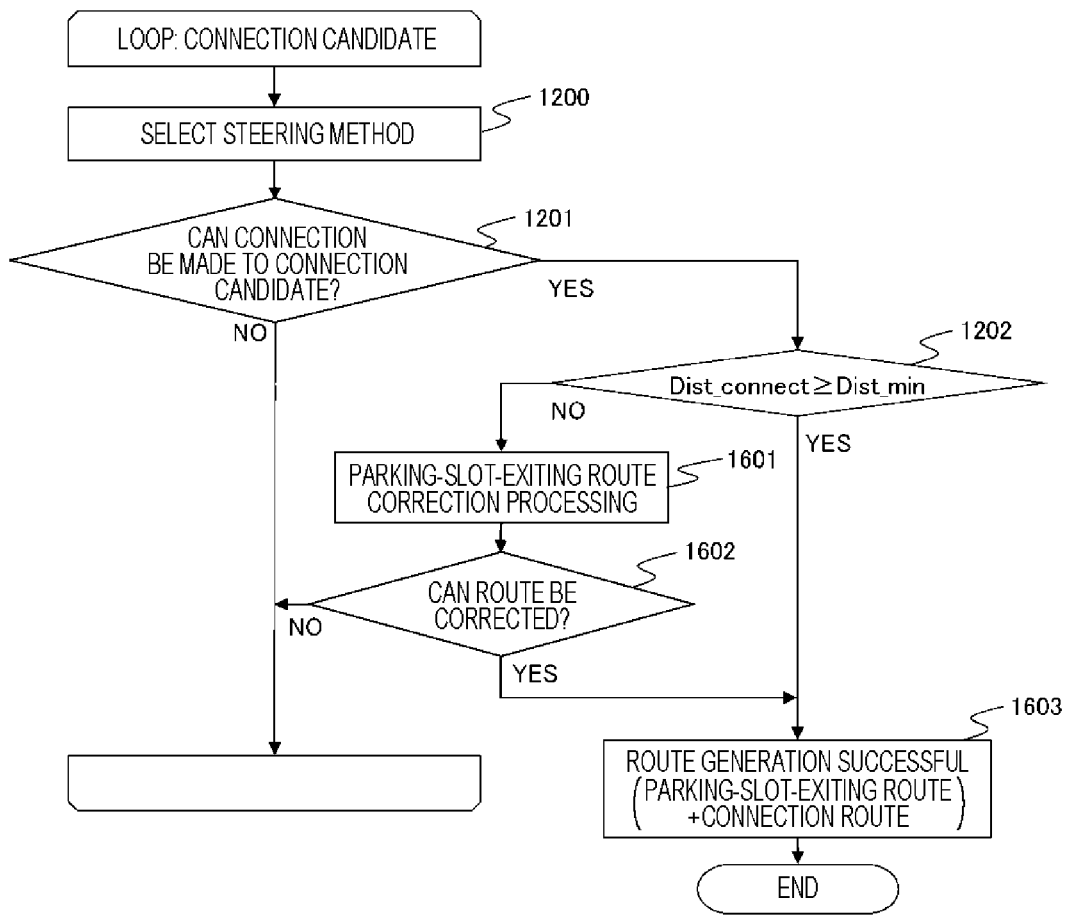
FIG. 16 is a flowchart showing a second embodiment of the present invention and an example of the connection determination processing.

A second embodiment shows an example of processing of connection path generation of Steps S604 and S605 of FIG. 6 shown in the first embodiment. FIG. 16 shows a flowchart of the processing of connection path generation in the second embodiment.

In Step S1200, the route generation unit 403 selects either one-side steering or S-shaped steering as a steering method from the automatic parking start position to the connection candidate position.

In Step S1201, whether or not connection can be made to the connection candidate by the steering method selected by the route generation unit 403 is determined, and in a case where connection can be made, the processing proceeds to S1202, and in a case where connection is not possible, determination is performed for a next connection candidate.

In Step S1202, when a one-side steering connection route length Dist_connect from the automatic parking start position A (FIGS. 13 and 14) to the reaching target position T is equal to or more than the minimum moving distance Dist_min, the route generation unit 403 determines that the route generation is successful, and stores the travel route (S603) calculated by calculation of the parking-slot-exiting route and the route calculated by generation of the connection route by one-side steering (S604) in the route information as the travel route.

In contrast, in a case where the one-side steering connection route length Dist_connect is less than the minimum moving distance Dist_min, the route generation unit 403 proceeds to parking-slot-exiting route correction processing (S1601).

Figure 17A:
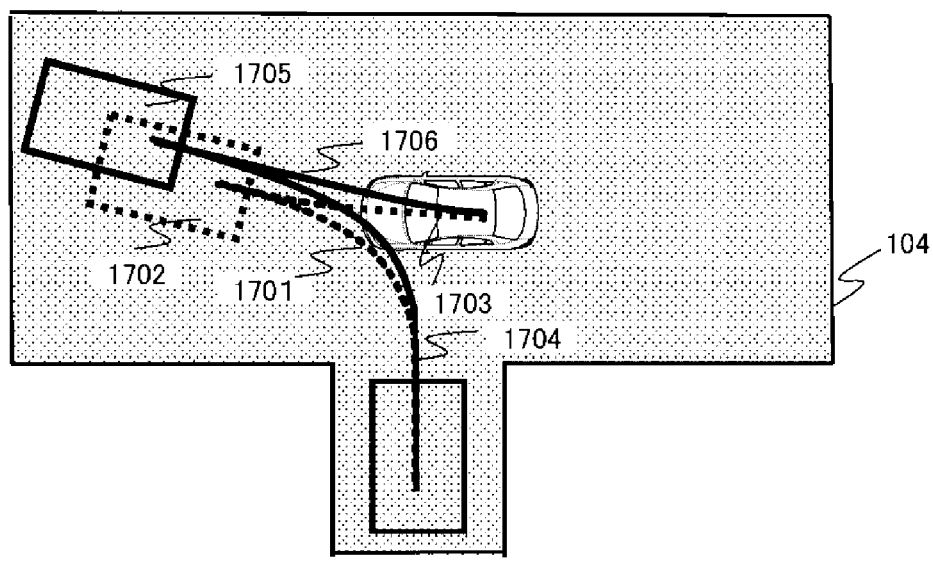
FIG. 17A is a plan view illustrating the second embodiment of the present invention and illustrating an example of parking-slot-exiting route correction processing.
Figure 17B:
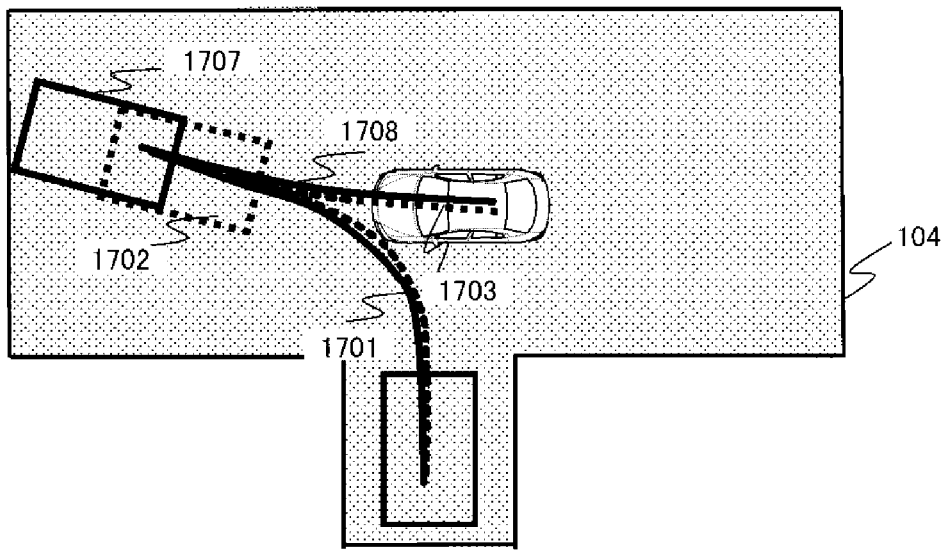
FIG. 17B is a plan view illustrating the second embodiment of the present invention and illustrating an example of the parking-slot-exiting route correction processing.

In Step S1601, as illustrated in FIGS. 17A and 17B, there is a method of enlarging a turning radius or providing (or extending) a straight line. FIG. 17A illustrates a parking-slot-exiting route 1701 (dotted line) calculated by the parking-slot-exiting route calculation and a connection position 1702 (dotted rectangle) determined to be connectable from the automatic parking start position.

In a case where the distance Dist_connect of a connection route 1703 connecting the automatic parking start position and the connection position 1702 is less than the minimum moving distance Dist_min, the turning radius of the parking-slot-exiting route is corrected significantly, so that a parking-slot-exiting route 1704 is obtained and a parking-slot-exiting position 1705 (solid rectangle) is also generated far away.

As a result, the distance Dist_connect of a connection route 1706 connecting the automatic parking start position and the connection position (parking-slot-exiting position 1705) also becomes long, and, in a case where the distance Dist_connect becomes equal to or more than the minimum moving distance Dist_min, the route generation unit 403 registers the connection route as the route information. Further, the method of correcting the parking-slot-exiting route is not limited to enlargement of the turning radius, and a method of adding a straight route may be used.

Specifically, as illustrated in FIG. 17B, the parking-slot-exiting route 1701 (dotted line) calculated by the parking-slot-exiting route calculation and the connection position 1702 (dotted rectangle) determined to be connectable from the automatic parking start position are shown.

In a case where the distance Dist_connect of the connection route 1703 connecting the automatic parking start position and the connection position 1702 is less than the minimum moving distance Dist_min, straight traveling is provided to (or extended in) the parking-slot-exiting route, so that a parking-slot-exiting position 1707 (solid rectangle) is generated far away.

As a result, the distance Dist_connect of a connection route 1708 connecting the automatic parking start position and the connection position (parking-slot-exiting position 1707) also becomes long, and, in a case where the distance Dist_connect becomes equal to or more than the minimum moving distance Dist_min, the distance Dist_connect is registered as the connection route.

Here, the parking-slot-exiting route correction processing is performed by using at least one or more of enlargement of the turning radius and addition of a straight traveling distance. At that time, the correction by enlargement of the turning radius is preferentially performed, and in a case where the correction by enlargement of the turning radius cannot be performed, the correction by addition of a straight traveling distance is performed. This is because the correction by enlargement of the turning radius results in a route that does not give the driver a sense of discomfort as compared with the case of adding straight traveling.

In Step S1602, the route generation unit 403 determines either one of the parking-slot-exiting route correction by enlargement of the turning radius and the parking-slot-exiting route correction by addition of straight traveling is possible. In a case where the parking-slot-exiting route correction is possible, the route generation is successful, and in a case where the parking-slot-exiting route correction is not possible, a next connection candidate is searched for.

As described above, according to the second embodiment, it is easy for the driver to perceive the planned operation of automatic parking even for various automatic parking start positions, and it is possible to expand a parking condition for enabling generation of a route in which the movement of the vehicle is smooth.

Further, in the second embodiment, similarly to the first embodiment, in the travel route generated by the route generation unit 403, the vehicle accelerates to the predetermined value Vth or more in a distance equal to or more than the minimum moving distance Dist_min. Accordingly, it is possible to prohibit generation of the travel route in which the vehicle stops immediately after starting and to provide automatic parking without causing a sense of discomfort for the driver and the passenger. Further, the vehicle control device 324 accelerates the vehicle to the predetermined value Vth or more of the vehicle speed at a set predetermined acceleration in the automatic parking, so as to allow the driver to perceive the movement of the vehicle by the automatic parking.

Third Embodiment

Figure 18:
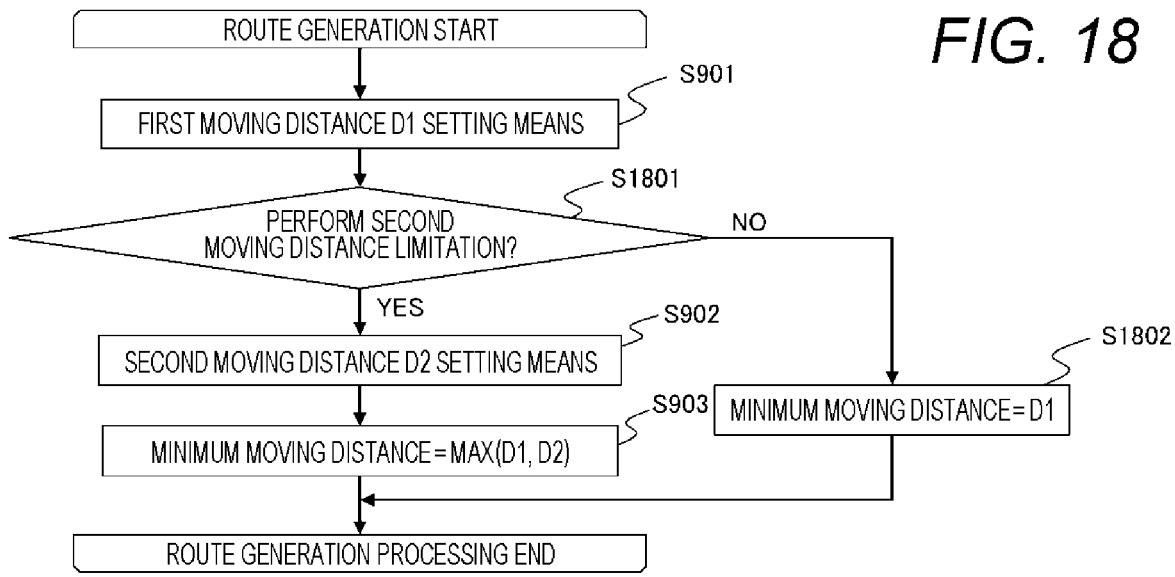
FIG. 18 is a flowchart showing a third embodiment of the present invention and an example of the minimum moving distance calculation processing.

A third embodiment shows an example of the calculation processing of a minimum moving distance in Step S702 of FIG. 7 shown in the first embodiment. FIG. 18 shows a flowchart of the calculation processing of a minimum moving distance in the third embodiment.

In Step S901, the route generation unit 403 sets the first moving distance D1. The first moving distance D1 is similar to that in the first embodiment and is a request value related to vehicle control, and is set depending on vehicle specifications.

In Step S1801, the route generation unit 403 performs determination of performing distance limitation by the second moving distance D2, and proceeds to Step S902 in a case where the distance limitation by the second moving distance D2 is performed, and proceeds to Step S1802 in a case where the distance limitation by the second moving distance D2 is not performed.

Here, a specific condition of Step S1801 will be described. As an example, in a case where turning back of a steering wheel is performed in a parking frame in order to match the position and angle of the vehicle 300 with a target parking position, the distance limitation by the second moving distance D2 is prohibited.

Figure 19:
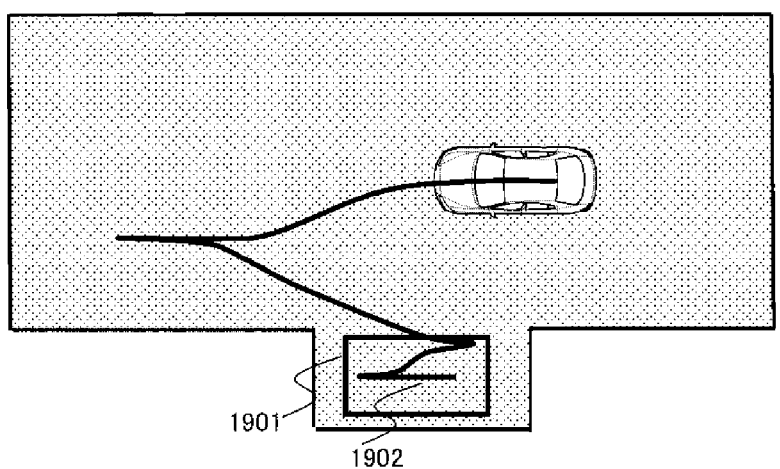
FIG. 19 is a plan view illustrating the third embodiment of the present invention and an example of performing a second moving distance limitation.

In particular, as illustrated in FIG. 19, in parallel parking or the like, after a part of the vehicle enters a parking frame 1901, a route 1902 in which turning back of a steering wheel is performed in the parking frame in order to match the position and the angle is obtained.

In this case, since the distance to an obstacle is short, even if the moving distance is short, a sense of discomfort is not given to the driver. Therefore, the route generation unit 403 does not perform the distance limitation by the second moving distance D2. In this manner, a more compact route can be generated.

Other than the above, as described in Step S509 of the first embodiment, in a case where a situation in which the travel route is recalculated during automatic parking is generated, the route generation unit 403 prohibits the distance limitation by the second moving distance D2.

The situation where the travel route is recalculated includes a case where the position of the obstacle 102 detected at the start of automatic parking greatly changes, a case where it is necessary to change the steering wheel turn-back position by shift switching, brake operation, or the like by the driver, and the like.

Figure 20A:
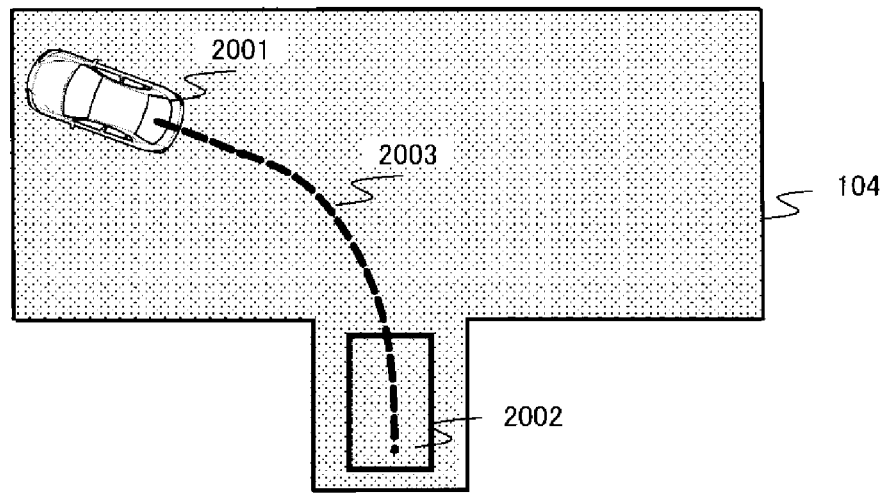
FIG. 20A is a plan view illustrating the third embodiment of the present invention and an example of performing the second moving distance limitation.
Figure 20B:
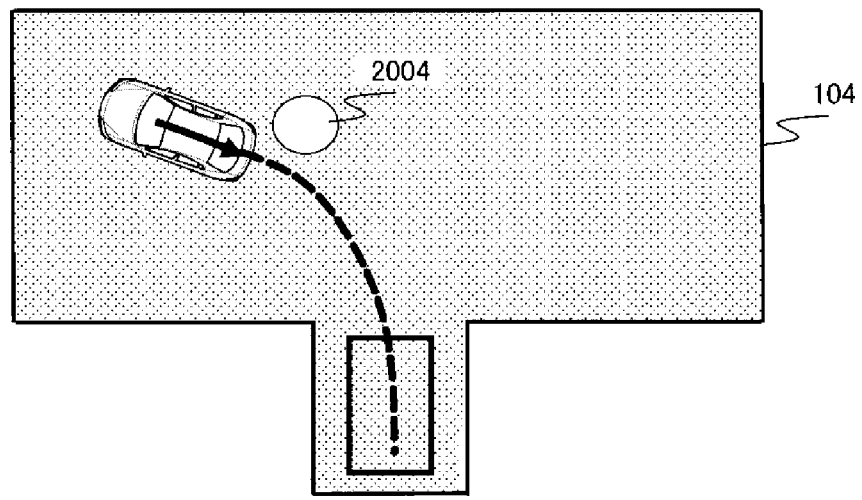
FIG. 20B is a plan view illustrating the third embodiment of the present invention and an example of performing the second moving distance limitation.
Figure 20C:
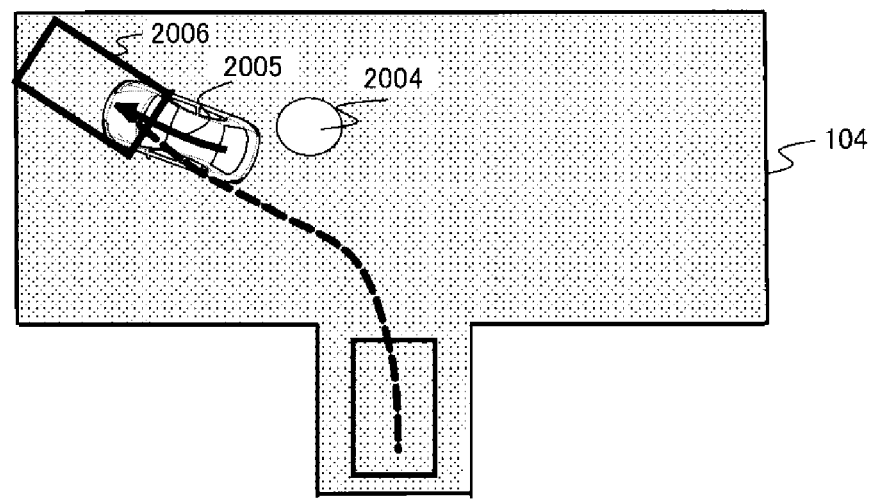
FIG. 20C is a plan view illustrating the third embodiment of the present invention and an example of performing the second moving distance limitation.

As an example, as illustrated in FIG. 20A, automatic parking is started on a parking route 2003 from an automatic parking start position 2001 to a target parking position 2002, and as illustrated in FIG. 20B, a dynamic obstacle 2004 or the like is detected, and, in a case of determining that parking is not possible on the parking route 2003, the route generation unit 403 recalculates the travel route. When the route generation unit 403 recalculates a forward movement route, in a case where the travelable area 104 is small, there is a case where only a short forward route 2005 leading to a steering wheel turn-back position 2006 as illustrated in FIG. 20C is generated.

However, continuing automatic parking as much as possible and enabling parking at a target parking position once automatic parking is started lead to improvement in merchantability. Therefore, the distance limitation by the second moving distance D2 is prohibited at the time of recalculation of the travel route.

In this manner, the possibility of route generation at the time of recalculation of the travel route increases, and the merchantability of the automatic parking system is improved. Furthermore, in an automatic parking system in which a driver does not intervene, for example, a system in which an infrastructure or control transmits a control command value to a vehicle to perform automatic parking, the distance limitation by the second moving distance D2 is not performed. In this manner, a more compact travel route can be generated.

Here, in the third embodiment, whether or not performing the distance limitation by the second moving distance D2 is possible is described. However, when the condition of performing the distance limitation is satisfied, the second moving distance D2 may be set to a small value as compared with a case where the condition for performing the distance limitation is not satisfied. The route generation unit 403 may compare the second moving distance D2 with the first moving distance D1 and set a larger one as the minimum moving distance Dist_min.

In Step S902, the route generation unit 403 sets a second moving distance D2. The second moving distance D2 is a request value for enabling the driver to perceive a next operation of automatic parking, and is a value set in advance by a display method of the travel route or the like.

In Step S903, the route generation unit 403 sets a larger one of the first moving distance D1 and the second moving distance D2 as the minimum moving distance Dist_min, and ends the present processing.

In Step S1802, the route generation unit 403 sets the first moving distance D1 as the minimum moving distance Dist_min, and ends the present processing.

As described above, according to the third embodiment, it is easy for the driver to perceive the planned operation of automatic parking by the vehicle control device 324 even for various automatic parking start positions, and it is possible to expand a parking condition for enabling generation of a route in which the movement of the vehicle is smooth.

Fourth Embodiment

A fourth embodiment shows an example of a method of setting the second moving distance D2 in Step S902 shown in the first embodiment. The second moving distance D2 is changed on the basis of a relationship between the automatic parking start position and the target parking position.

Figure 21A:
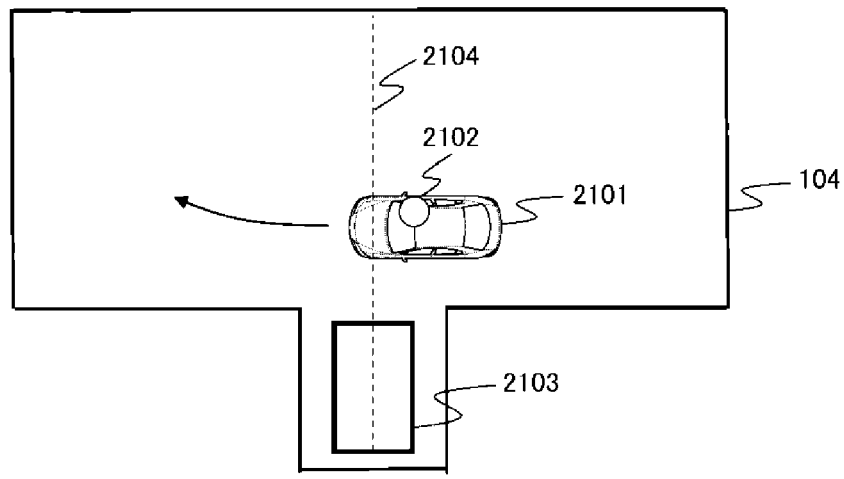
FIG. 21A is a plan view illustrating a fourth embodiment of the present invention and an example of a setting method of a second moving distance.

Specifically, as illustrated in FIG. 21A, in a case where parking is started by forward movement (arrow in the diagram), when an automatic parking start position 2101, specifically, a seating position 2102 of the driver, is on the right side in the diagram with respect to a line 2104 extended from the center of a target parking position 2103, the driver is conscious of using a space further in front. For this reason, the second moving distance D2 is set to be long.

In other words, in a case where the travel route from the automatic parking start position approaches the target parking position, the route generation unit 403 increases the second moving distance D2.

Figure 21B:
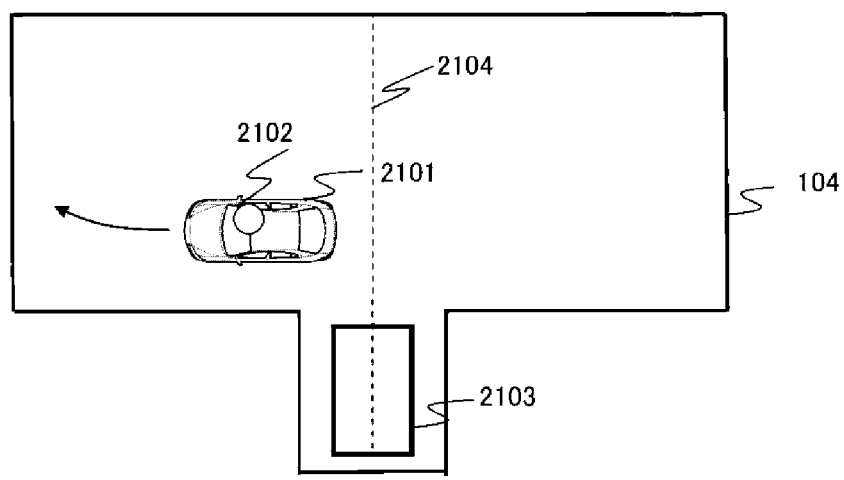
FIG. 21B is a plan view illustrating the fourth embodiment of the present invention and an example of a setting method of the second moving distance.

In contrast, as illustrated in FIG. 21B, in a case where parking is started by forward movement (arrow), when the automatic parking start position 2001, specifically, the seating position 2102 of the driver, is on the left side in the diagram with respect to the line 2104 extended from the center of the target parking position 2103, the driver is conscious of not being away from the parking position as much as possible. For this reason, the second moving distance D2 is set to be short.

In other words, in a case where the travel route from the automatic parking start position becomes away from the target parking position, the route generation unit 403 decreases the second moving distance D2.

Figure 21C:
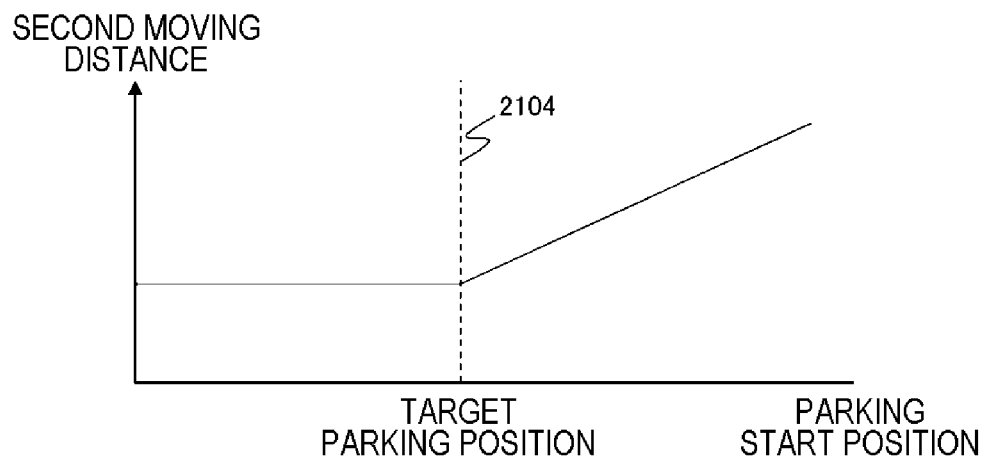
FIG. 21C is a graph showing the fourth embodiment of the present invention and an example of the setting method of the second moving distance.

Therefore, as shown in FIG. 21C, the second moving distance D2 may be set to be longer in a case where the automatic parking start position 2001 or the seating position 2102 of the driver is on the right side in the diagram than in a case where the seating position is on the left side in the diagram with respect to the target parking position 2103.

In other words, in a case where the automatic parking start position 2101 approaches the extension line 2104 of the center of the target parking position 2103, the second moving distance D2 is set to be longer as the distance to the extension line 2104 increases. In contrast, in a case where the automatic parking start position 2101 passes (becomes away from) the extension line 2104 of the center of the target parking position 2103, the second moving distance D2 is set to a short predetermined value.

Figure 22A:
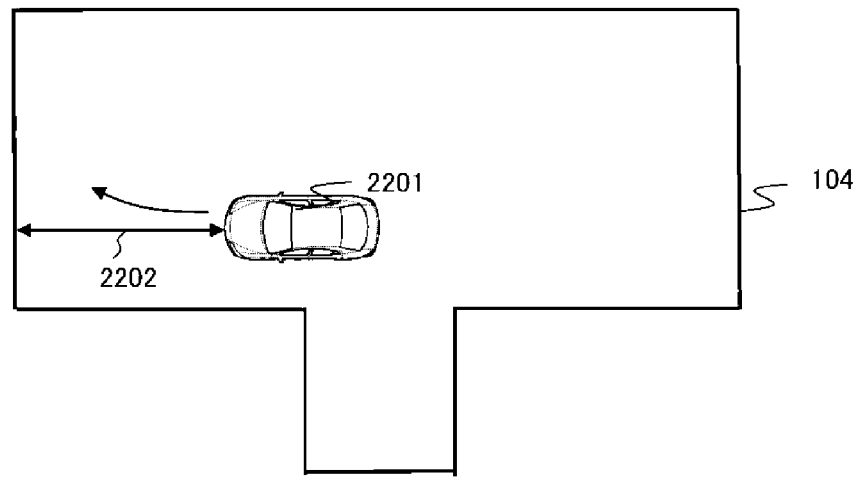
FIG. 22A is a plan view illustrating the fourth embodiment of the present invention and an example of the setting method of the second moving distance.

Further, the second moving distance D2 may be changed on the basis of a distance from the automatic parking start position until the vehicle comes into contact with a boundary of an obstacle or the travelable area. Specifically, as illustrated in FIG. 22A, in a case where parking is started by forward movement (arrow), the route generation unit 403 calculates a distance 2202 from the automatic parking start position 2201 until the vehicle comes into contact with the boundary of the travelable area 104, and changes the second moving distance D2 on the basis of the distance 2202 between the automatic parking start position and the position of an obstacle (boundary).

Figure 22B:
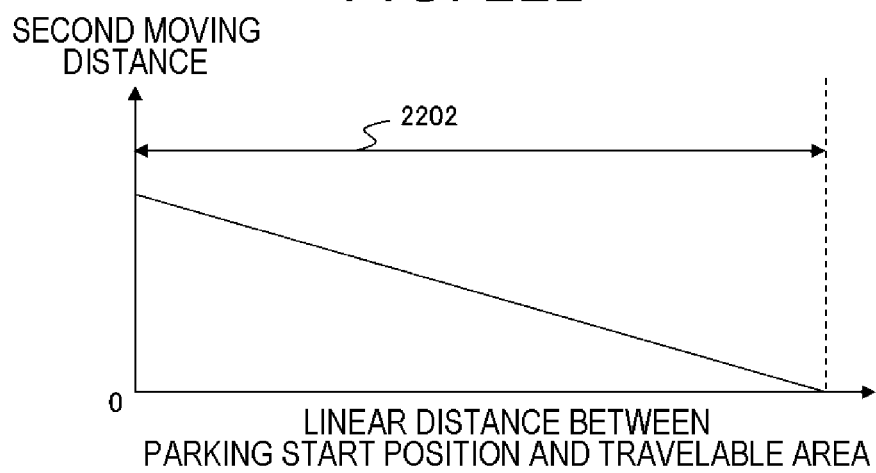
FIG. 22B is a graph showing the fourth embodiment of the present invention and an example of the setting method of the second moving distance.
Figure 23:
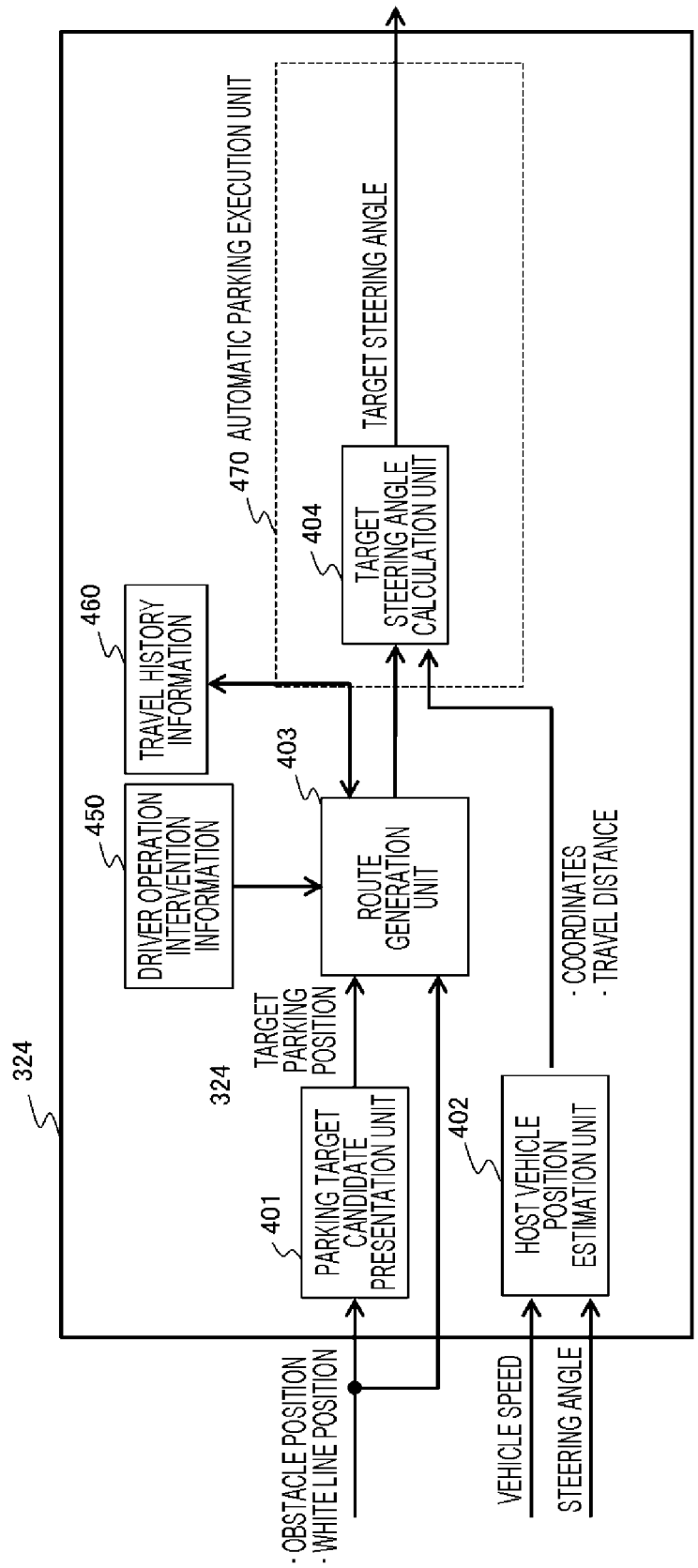
FIG. 23 is a block diagram illustrating a fifth embodiment of the present invention and an example of a function of the vehicle control device.

This is because, as the distance to the obstacle (boundary) is shorter, the driver does not have a sense of discomfort even if the distance to travel is short. Therefore, as an example, as shown in FIG. 22B, the second moving distance D2 may be set to be shorter as a linear distance between the automatic parking start position and the travelable area is larger.

As described above, according to the fourth embodiment, it is possible to generate a travel route suitable for the driving feeling of the driver even for various automatic parking start positions.

Fifth Embodiment

A fifth embodiment shows an example of setting of the minimum moving distance Dist_min (Step S702 in FIG. 7) in a case where the present invention is applied to parking assistance, in which, among the functions of the vehicle control device 324 described in the first embodiment, control of a steering angle is performed automatically, and the driver operates the accelerator and the brake to adjust the speed.

In the fifth embodiment, since the driver operates the accelerator and the brake to control the speed, it is necessary to immediately step on the brake after releasing the brake in order to travel a short distance, and the operation becomes troublesome. Therefore, by setting the first moving distance D1 to a larger value than that when the speed is automatically controlled, the driver can perform an operation without hurry.

CONCLUSION

As described above, the vehicle control device 324 of the first to fifth embodiments can have configurations below.

(1). The vehicle control device 324 has the processor 1 and the memory 2, is mounted on the vehicle 300, and controls the vehicle 300 to the target parking position. The vehicle control device 324 includes the obstacle detection unit (surrounding situation recognition sensor 325) that detects a position of an obstacle around the vehicle 300, the travelable area setting unit (parking target candidate presentation unit 401) that sets an area where the vehicle can travel as the travelable area 104 based on a position of the obstacle, and sets the target parking position in the travelable area 104, the route generation unit 403 that calculates a travel route to the target parking position in the travelable area 104, and the parking execution unit (automatic parking execution unit 470) that causes the vehicle 300 to travel toward the target parking position on the basis of the travel route. The route generation unit 403 generates a route from a set parking start position to the target parking position in one or more sections, and corrects a distance of the section to the predetermined distance (minimum moving distance Dist_min) or more in a case where the distance of the section is less than the predetermined distance (minimum moving distance Dist_min).

By the above configuration, it is possible to allow the driver to perceive the planned operation of automatic parking even for various automatic parking start positions, and to make the movement of the vehicle 300 in automatic parking smooth.

Furthermore, by correcting one section to a predetermined distance (minimum moving distance Dist_min) or more, the vehicle speed during automatic parking can be set to be large, and control accuracy during automatic parking can be ensured.

Further, in the first embodiment, since the actual vehicle speed is accelerated to the predetermined value Vth or more, it is possible to avoid traveling at an extremely low speed as in the conventional embodiment and to ensure the control accuracy of automatic parking.

(2). In the vehicle control device 324 according to (1) described above, the route generation unit 403 includes the steering wheel turn-back position 1100 at which a traveling direction is switched in the section, and enlarges a turning radius in the section or adds a linear route to a travel route in the section to correct the distance of the section to the predetermined distance (minimum moving distance Dist_min) or more in a case where the distance of the section is less than the predetermined distance (minimum moving distance Dist_min).

By the above configuration, it is possible to correct a distance of a section to the predetermined distance (minimum moving distance Dist_min) or more by enlarging a turning radius or adding a linear route, increase the vehicle speed to ensure the control accuracy, and bring the movement of the vehicle by automatic parking closer to the driver.

(3). In the vehicle control device 324 according to (2) described above, the route generation unit 403 adds a linear route to the section to correct the distance of the section to the predetermined distance (minimum moving distance Dist_min) or more in a case where the distance of the section is less than the predetermined distance (minimum moving distance Dist_min) and a turning radius in the section cannot be enlarged.

By the above configuration, it is possible to correct a distance of a section to the predetermined distance (minimum moving distance Dist_min) or more by adding a linear route, increase the vehicle speed to ensure the control accuracy, and bring the movement of the vehicle by automatic parking closer to the driver.

(4). In the vehicle control device 324 according to (1) described above, in which the route generation unit 403 selects, as the predetermined distance (minimum moving distance Dist_min), a larger one of the first moving distance D1 set as a minimum moving distance based on a vehicle speed and the second moving distance D2 set as a predetermined moving distance for causing a driver to perceive movement by automatic parking.

By the above configuration, the predetermined distance of the section in the automatic parking can satisfy the minimum moving distance based on the vehicle speed and the distance that allows the driver to perceive movement by automatic parking.

(5). In the vehicle control device 324 according to (4) described above, in which the target parking position has the range (parking frame 120) enclosing the vehicle 300, and the route generation unit prohibits use of the second moving distance D2 in a case where a part of an end point of the vehicle is within the range (parking frame 120).

By the above configuration, in a case where turning back of a steering wheel is performed in the parking frame 120 in order to match the position and angle of the vehicle 300 with a target parking position, the distance limitation by the second moving distance D2 is not performed. In particular, in a case of parallel parking or the like, after a part of the vehicle 300 enters the parking frame 1901 as illustrated in FIG. 19, the route 1902 in which turning back of a steering wheel is performed in the parking frame in order to match the position and the angle is obtained. In this case, since the distance to an obstacle is short, even if the moving distance is short, a sense of discomfort is not given to the driver. Therefore, the route generation unit 403 does not perform the distance limitation by the second moving distance D2. In this manner, a more compact route can be generated.

(6). In the vehicle control device 324 according to (4) described above, the route generation unit 403 prohibits use of the second moving distance D2 in a case where recalculation occurs in calculation of the travel route.

By the above configuration, continuing automatic parking as much as possible and enabling parking at a target parking position once automatic parking is started lead to improvement in merchantability. Therefore, the distance limitation by the second moving distance D2 is not performed at the time of recalculation of the travel route. In this manner, the possibility of route generation at the time of recalculation of the travel route increases, and the merchantability of the automatic parking system is improved. Furthermore, in an automatic parking system in which a driver does not intervene, for example, a system in which an infrastructure or control transmits a control command value to a vehicle to perform automatic parking, the distance limitation by the second moving distance D2 is not performed. In this manner, a more compact travel route can be generated.

(7). In the vehicle control device 324 according to (4) described above, the route generation unit 403 sets the second moving distance D2 to be short in a case where a travel route from the parking start position is in a direction away from the target parking position, as compared with a case where a travel route from the parking start position approaches the target parking position.

By the above configuration, it is possible to generate a travel route suitable for the driving feeling of the driver even for various automatic parking start positions.

(8). In the vehicle control device 324 according to (4) described above, the route generation unit 403 sets the second moving distance D2 to be shorter as a distance between the parking start position and an obstacle is shorter in a case where the obstacle detection unit detects the obstacle.

By the above configuration, by setting the second moving distance D2 to be short, automatic parking can be performed quickly, since, as the distance to an obstacle (boundary) is shorter, the driver does not have a sense of discomfort even if the distance to travel is short.

(9). In the vehicle control device 324 according to (4) described above, the first moving distance D1 is a distance in which the vehicle speed reaches the predetermined value Vth.

By the above configuration, since the vehicle speed during automatic parking can be set to be high, it is possible to avoid traveling at an extremely low speed as in the conventional embodiment and to ensure the control accuracy of automatic parking.

(10). In the vehicle control device 324 according to (4) described above, the vehicle control device is connected to the display unit (input/output device 327) that displays a travel route, and the second moving distance D2 relates to a length when the route generation unit 403 outputs the travel route planned for traveling to the display unit (327).

By the above configuration, it is possible to allow the driver to perceive a planned travel route during automatic parking, and to realize automatic parking without a sense of discomfort.

(11). In the vehicle control device 324 according to (9) described above, the route generation unit 403 sets a larger value to the predetermined value Vth of the vehicle speed as resolution or accuracy of a wheel speed sensor that estimates a self-position of the vehicle 300 is higher.

By the above configuration, since the vehicle speed during automatic parking can be set to be high, it is possible to avoid traveling at an extremely low speed as in the conventional embodiment and to ensure the control accuracy of automatic parking.

(12). In the vehicle control device 324 according to (9) described above, the route generation unit 403 sets a larger value to the predetermined value Vth of the vehicle speed as a gradient of the travelable area 104 is larger.

By the above configuration, since the vehicle speed during automatic parking can be set to be high, it is possible to avoid traveling at an extremely low speed as in the conventional embodiment and to ensure the control accuracy of automatic parking.

Note that the present invention is not limited to the above embodiment and includes a variety of variations.

For example, the above embodiments are described in detail for easier understanding of the present invention, and the present invention is not necessarily limited to the embodiments that include the entirety of the described configurations. Further, a part of a configuration of a certain embodiment can be replaced with a configuration of another embodiment, and a configuration of a certain embodiment can also be added to a configuration of another embodiment. Further, for a part of the configuration of each embodiment, any addition, deletion, or replacement of other configurations can be applied alone or in combination.

Further, a part or whole of the above configurations, functions, processing units, processing means, and the like may be obtained as hardware by way of, for example, designing them as an integrated circuit. Further, the above configurations, functions, and the like may be realized by software in a manner that a processor interprets and executes programs that realizes functions of them. Information, such as a program that performs each function, a table, and a file, can be placed in recording devices, such as a memory, a hard disk, and a solid state drive (SSD), or recording media, such as an IC card, an SD card, and a DVD.

Further, a control line and an information line which are considered necessary for explanation are shown, and not all control lines or information lines necessarily shown on the product. In practice, almost all configurations can be considered to be connected mutually.

REFERENCE SIGNS LIST 102 obstacle
103 obstacle position information
104 travelable area
105 steering wheel turn-back position
106 target parking position
107 planned moving route
300 vehicle
310 driving force generation mechanism
311 brake
312 transmission
313 steering
314 wheel
320 driving force control device
321 brake control device
322 steering control device
323 transmission control device
324 vehicle control device
325 surrounding situation recognition sensor
326 vehicle speed sensor
401 parking target candidate presentation unit
402 self-position estimation unit
403 route generation unit
404 target steering angle calculation unit
405 target vehicle speed calculation unit
406 target driving force calculation unit
407 forward/backward movement switching determination unit
601 target parking frame
701 automatic parking start position

The invention claimed is:

1. A vehicle control device that is mounted on a vehicle, and controls the vehicle to a target parking position, the vehicle control device comprising:
a memory; and
a processor communicatively coupled to the memory, wherein the processor is configured to:
detect a position of an obstacle around the vehicle;
set an area where the vehicle can travel as a travelable area based on a position of the obstacle, and set the target parking position in the travelable area;
calculate a travel route to the target parking position in the travelable area; and
cause the vehicle to travel toward the target parking position on the basis of the travel route
generate a route from a set parking start position to the target parking position in one or more sections, and correct a distance of the section to a predetermined distance or more in a case where the distance of the section is less than the predetermined distance; and
select, as the predetermined distance, the larger of a first moving distance, set as a minimum moving distance based on a vehicle speed, and a second moving distance, set as a predetermined moving distance for causing a driver to perceive movement by automatic parking.

2. The vehicle control device according to claim 1, wherein
the processor
includes a steering wheel turn-back position at which a traveling direction is switched in the section, and enlarges a turning radius in the section or adds a linear route to a travel route in the section to correct the distance of the section to the predetermined distance or more in a case where the distance of the section is less than the predetermined distance.

3. The vehicle control device according to claim 2, wherein
the processor
adds a linear route to the section to correct the distance of the section to the predetermined distance or more in a case where the distance of the section is less than the predetermined distance and a turning radius in the section cannot be enlarged.

4. The vehicle control device according to claim 1, wherein
the target parking position has a range enclosing a vehicle, and
the processor
prohibits use of the second moving distance in a case where a part of an end point of the vehicle is within the range.

5. The vehicle control device according to claim 1, wherein
the processor
prohibits use of the second moving distance in a case where recalculation occurs in calculation of the travel route.

6. The vehicle control device according to claim 1, wherein
the processor
sets the second moving distance to be shorter in a case where a travel route from the parking start position is in a direction away from the target parking position, as compared with a case where a travel route from the parking start position approaches the target parking position.

7. The vehicle control device according to claim 1, wherein
the processor
sets the second moving distance to be shorter as a distance between the parking start position and an obstacle is shorter in a case where the processor detects the obstacle.

8. The vehicle control device according to claim 1, wherein
the first moving distance is a distance in which the vehicle speed reaches a predetermined value Vth.

9. The vehicle control device according to claim 8, wherein
the processor
sets a larger value to a predetermined value Vth of the vehicle speed as resolution or accuracy of a wheel speed sensor that estimates a self-position of the vehicle is higher.

10. The vehicle control device according to claim 8, wherein
the processor
sets a larger value to a predetermined value Vth of the vehicle speed as a gradient of the travelable area is larger.

11. The vehicle control device according to claim 1, wherein
the vehicle control device is connected to a display that displays a travel route, and
the second moving distance relates to a length when the processor outputs the travel route planned for traveling to the display.

\* \* \* \* \*